United States Patent
Nair et al.

(10) Patent No.: US 10,138,342 B2
(45) Date of Patent: *Nov. 27, 2018

(54) FORMABLE AND FOAMED AQUEOUS COMPOSITIONS

(71) Applicant: Eastman Kodak Company, Rochester, NY (US)

(72) Inventors: Mridula Nair, Penfield, NY (US); Mary Christine Brick, Webster, NY (US); Ellen M. Pyszczek, LeRoy, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 15/239,915

(22) Filed: Aug. 18, 2016

(65) Prior Publication Data

US 2018/0051150 A1 Feb. 22, 2018

(51) Int. Cl.
- *C08J 9/00* (2006.01)
- *C08J 9/30* (2006.01)

(52) U.S. Cl.
CPC .......... *C08J 9/0061* (2013.01); *C08J 9/0066* (2013.01); *C08J 9/30* (2013.01); *C08J 2333/08* (2013.01); *C08J 2333/20* (2013.01); *C08J 2401/08* (2013.01); *C08J 2401/28* (2013.01)

(58) Field of Classification Search
CPC . C08J 9/0061; C08J 9/0066; C08J 9/30; C08J 2333/08; C08J 2333/20; C08J 2401/08; C08J 2401/28
See application file for complete search history.

(56) References Cited

U.S. PATENT DOCUMENTS

| | | |
|---|---|---|
| 3,296,023 A | 1/1967 | Leaderman et al. |
| 3,527,654 A | 9/1970 | Jones et al. |
| 3,607,341 A | 9/1971 | Goins et al. |
| 3,615,970 A | 10/1971 | May |
| 3,713,868 A | 1/1973 | Gordon et al. |
| 3,748,217 A | 7/1973 | May et al. |
| 3,862,291 A | 1/1975 | Brandon, Jr. et al. |
| 4,056,646 A | 11/1977 | Westfall et al. |
| 4,137,380 A | 1/1979 | Gunning et al. |
| 4,362,774 A | 12/1982 | Brandon, Jr. et al. |
| 4,397,346 A | 8/1983 | Chumbley et al. |
| 4,409,275 A | 10/1983 | Samowich |
| 4,439,473 A | 3/1984 | Lippman |
| 4,457,980 A | 7/1984 | Daniels et al. |
| 4,608,298 A | 8/1986 | Klaff |
| 4,677,016 A | 6/1987 | Ferziger et al. |
| 4,830,897 A | 5/1989 | Lichtenstein |
| 5,019,445 A | 5/1991 | Sternlieb |
| 5,132,163 A | 7/1992 | Leaderman et al. |
| 5,360,668 A | 11/1994 | Sternlieb |
| 5,565,265 A | 10/1996 | Rubin et al. |
| 5,576,054 A | 11/1996 | Brown |
| 5,741,582 A | 4/1998 | Leaderman et al. |
| 6,439,269 B1 | 8/2002 | Weil et al. |
| 7,572,846 B2 | 8/2009 | Engelbrecht et al. |
| 8,252,414 B2 | 8/2012 | Putnam et al. |
| 8,329,783 B2 | 12/2012 | Nair et al. |
| 8,435,340 B2 | 5/2013 | Wheeler et al. |
| 2002/0122949 A1 | 9/2002 | Richards |
| 2012/0097194 A1* | 4/2012 | McDaniel ............ A01N 63/02 134/26 |
| 2012/0167666 A1 | 7/2012 | Nair et al. |
| 2015/0234098 A1 | 8/2015 | Lofftus et al. |

FOREIGN PATENT DOCUMENTS

| | | |
|---|---|---|
| EP | 1380616 | 11/1984 |
| WO | WO84/04489 A1 | 11/1984 |

* cited by examiner

*Primary Examiner* — John M Cooney

(74) *Attorney, Agent, or Firm* — J. Lanny Tucker

(57) ABSTRACT

Foamable aqueous compositions can be foamed and applied to porous substrates to make light-blocking dry opacifying elements. Such compositions have 0.05-15 weight % of porous particles; at least 20 weight % of a binder; at least 0.0001 weight % of additives (including a surfactant); water; and at least 0.001 weight % of an opacifying colorant. Each porous particle includes a continuous polymeric phase and discrete pores; a mode particle size of 2-50 μm; and a porosity of 20-70 volume %. The continuous polymeric phase $T_g$ is >80° C. and has a polymer viscosity of 80-500 centipoises at an ethyl acetate shear rate of 100 $sec^{-1}$ at a concentration of 20 weight % at 25° C. The dry opacifying element light blocking value is at least 4 and has a luminous reflectance >40% as measured by the Y tristimulus value. The foamed aqueous composition has a foam density of 0.1-0.5 $g/cm^3$.

23 Claims, No Drawings

FORMABLE AND FOAMED AQUEOUS COMPOSITIONS

RELATED APPLICATIONS

Reference is made to the following copending and commonly assigned patent applications:

U.S. Ser. No. 15/144,893 filed May 3, 2016) that is a continuation-in-part of commonly assigned U.S. Ser. No. 14/730,280, filed Jun. 4, 2015, now abandoned.

U.S. Ser. No. 15/144,875 filed May 3, 2016, recently allowed, that is a continuation-in-part of commonly assigned U.S. Ser. No. 14/730,269, filed Jun. 4, 2015, now abandoned;

U.S. Ser. No. 15/144,911 filed May 3, 2016 that is also a continuation-in-part of commonly assigned U.S. Ser. No. 14/730,280, filed Jun. 4, 2015, now abandoned;

U.S. Ser. No. 15/239,938 filed on Aug. 18, 2016; and
U.S. Ser. No. 15/239,978 filed on Aug. 18, 2016;

the disclosures of all of which applications are incorporated herein by reference.

FIELD OF THE INVENTION

This invention relates to a foamable aqueous composition that includes unique porous particles in a mixture with other essential components so that composition foaming, application to a porous substrate, drying, and densifying can be readily accomplished to provide a light-blocking and lightly colored foamed, opacifying element having a light blocking value of at least 4 as well as a luminous reflectance that is greater than 40% as measured by the Y tristimulus value.

BACKGROUND OF THE INVENTION

In general, when light strikes a surface, some of it may be reflected, some absorbed, some scattered, and the rest transmitted. Reflection can be diffuse, such as light reflecting off a rough surface such as a white wall, in all directions, or specular, as in light reflecting off a mirror at a definite angle. An opaque substance transmits almost no light, and therefore reflects, scatters, or absorbs all of it. Both mirrors and carbon black are opaque. Opacity depends on the frequency of the light being considered. "Blackout" or light blocking materials typically refer to coated layers in articles that are substantially impermeable to light such as visible or UV radiation. Thus, when a blackout material such as a blackout curtain is hung over a window, it generally blocks substantially all external light from entering the room through that window. Blackout materials are suitable as curtains and shades for domestic use, for institutional use in hospitals and nursing homes, as well as for use in commercial establishments such as hotels, movie theaters, and aircraft windows where the option of excluding light can be desirable.

Light blocking articles such as the blackout curtains can be comprised of a fabric (porous) substrate coated with more than one layer of a foamed latex composition. There is a desire for these curtains, in addition to blocking transmitted light, to have a light color (hue) facing the environment when an activity needs illumination so as to minimize the amount of artificial lighting needed to perform the activity. An example is when the function of the blackout material is to separate two areas of activity where one or both areas can be artificially lit at the same time. However, more often than not, the function of a blackout curtain is to prevent sunlight from entering a room through a building window. It can also be desirable for the color (hue) of the back side to match the external décor of the building.

Light colored blackout curtains can be made by coating a fabric with light colored foams containing light scattering pigments such as titanium dioxide or clays. However, very thick foam coatings will be needed to create blackout curtains through which the sun is not visible in a darkened room using only these pigments. One method that is used to reduce the weight of such blackout materials is to sandwich a light-absorbing, foamed black or grey pigment, such as carbon black layer between two light scattering, white pigment-containing layers.

When an electromagnetic radiation blocking coating has, as it often does, a strongly light absorbing material containing black pigments such as carbon black, between two reflective layers, it has at least two distinct problems. First, such materials require three separate coating operations that reduce manufacturing productivity and increase unit costs. Secondly, carbon black in the light absorbing middle layer can become "fugitive" (or non-enclosed) from some puncture or tear occurring during sewing or laundering, and soil other layers such as the reflective layers, which is highly objectionable. Additionally, the stitches generated in the materials during sewing can cause the fugitive carbon from the light absorbing layer to spread over a larger area thereby increasing the area of objectionable shading of the light colored surface.

U.S. Pat. No. 7,754,409 (Nair et al.), U.S. Pat. No. 7,887,984 (Nair et al.), U.S. Pat. No. 8,252,414 (Putnam et al.), and U.S. Pat. No. 8,329,783 (Nair et al.) describe porous polymer particles that are made by a multiple emulsion process, wherein the multiple emulsion process provides formation of individual porous particles comprising a continuous polymer phase and multiple discrete internal pores, and such individual porous particles are dispersed in an external aqueous phase. The described Evaporative Limited Coalescence (ELC) process is used to control the particle size and distribution while a hydrocolloid is incorporated to stabilize the inner emulsion of the multiple emulsion that provides the template for generating the pores in the porous particles.

U.S. Patent Application Publication 2015/0234098 (Lofftus et al.) describes improved articles that are designed with an opacifying layer that is capable of blocking predetermined electromagnetic radiation. The opacifying layer is disposed on a substrate that can be composed of any suitable material and a porous or non-porous underlying layer can be incorporated between the substrate and the opacifying layer. While these articles have numerous advantages and represent an important advance in the art, there is a need for further improvement in providing opacifying articles that are lighter in weight; and that have improved flexibility, good "hand," while maintaining light coloration of the surfaces facing an observer without losing reflectivity, and light-absorptive properties; launderability; and minimizing dark opacifying agents getting out into the environment upon stitching and handling.

An improvement in this art is provided by the foamed aqueous compositions described and claimed in recently allowed U.S. Ser. No. 15/144,875 (noted above) in which very small amounts of opacifying colorants can be incorporated into porous particles, and the resulting composition has a foam density of at least 0.1 g/cm$^3$.

While the noted foamed compositions and foamed, opacifying elements described in the previous commonly assigned patent applications provide an advance in the art, there is continued need for improvements. There is a need for superior opacifying compositions and articles containing porous particles that provide improved light scattering and opacity to a dry opacifying layer by maintaining the porosity and pores in the porous particles during high temperature drying and long residence times in the dryers, after applying the foamed aqueous composition on porous substrates. There is also a need to have higher porosity derived from a large number of smaller pores that can result in better light scattering to provide greater luminosity.

SUMMARY OF THE INVENTION

The present invention provides a foamable aqueous composition that has at least 35% solids and up to and including 70% solids, and comprises:

(a) at least 0.05 weight % and up to and including 15 weight % of porous particles, each porous particle comprising a continuous polymeric phase and a first set of discrete pores dispersed within the continuous polymeric phase, the porous particles having a mode particle size of at least 2 µm and up to and including 50 µm and a porosity of at least 20 volume % and up to and including 70 volume %, and the continuous polymeric phase having a glass transition temperature greater than 80° C. and comprising a polymer having a viscosity of at least 80 centipoises and up to and including 500 centipoises at a shear rate of 100 sec$^{-1}$ in ethyl acetate at a concentration of 20 weight % at 25° C., (b) at least 20 weight % of a binder material;

(c) at least 0.0001 weight % of one or more additives comprising at least one surfactant;

(d) water; and (e) at least 0.001 weight % of an opacifying colorant different from all of the one or more (c) additives, which opacifying colorant absorbs predetermined electromagnetic radiation, all amounts based on the total weight of the foamable aqueous composition, wherein the foamable aqueous composition can provide a dry opacifying layer having a light blocking value of at least 4 as well as a luminous reflectance that is greater than 40% as measured by the Y tristimulus value.

In some embodiments, the foamable aqueous composition has at least 40% solids and up to and including 60% solids, and:

the continuous polymeric phase comprises at least 70 weight % and up to and including 100 weight %, based on the total polymer weight in the continuous polymeric phase, of one or more polymers derived from one or more of cellulose acetate, cellulose butyrate, cellulose acetate butyrate, and cellulose acetate propionate;

the porous particles are present in an amount of at least 0.5 weight % and up to and including 10 weight %;

the binder material is present in an amount of at least 30 weight % and up to and including 50 weight % and has a glass transition temperature of less than 25° C.;

the one or more (c) additives further comprise an optical brightener in an amount of at least 0.01 weight % and up to and including 2 weight %; and carbon black is present as at least one opacifying colorant in an amount of at least 0.003 weight % and up to and including 0.2 weight %, all amounts being based on the total weight of the foamable aqueous composition.

The present invention also provides a foamed aqueous composition that has at least 35% solids and up to and including 70% solids, and comprises:

(a) at least 0.05 weight % and up to and including 15 weight % of porous particles, each porous particle comprising a continuous polymeric phase and a first set of discrete pores dispersed within the continuous polymeric phase, the porous particles having a mode particle size of at least 2 µm and up to and including 50 µm and a porosity of at least 20 volume % and up to and including 70 volume %, and the continuous polymeric phase having a glass transition temperature greater than 80° C. and comprising a polymer having a viscosity of at least 80 centipoises and up to and including 500 centipoises at a shear rate of 100 sec$^{-1}$ in ethyl acetate at a concentration of 20 weight % at 25° C., (b) at least 20 weight % of a binder material;

(c) at least 0.0001 weight % of one or more additives comprising at least one surfactant;

(d) water; and (e) at least 0.001 weight % of an opacifying colorant different from all of the one or more (c) additives, which opacifying colorant absorbs predetermined electromagnetic radiation, all amounts based on the total weight of the foamed aqueous composition, and wherein the foamed aqueous composition having a foam density of at least 0.1 g/cm$^3$ and up to and including 0.5 g/cm$^3$, and the foamed aqueous composition can provide a dry opacifying layer having a light blocking value of at least 4 as well as a luminous reflectance that is greater than 40% as measured by the Y tristimulus value.

In some embodiments, the foamed aqueous composition has at least 40% and up to and including 60% solids, and:

the continuous polymeric phase comprises at least 70 weight % and up to and including 100 weight %, based on the total polymer weight in the continuous polymeric phase, of one or more polymers derived from one or more of cellulose acetate, cellulose butyrate, cellulose acetate butyrate, and cellulose acetate propionate;

the porous particles are present in an amount of at least 0.5 weight % and up to and including 10 weight %;

the binder material is present in an amount of at least 30 weight % and up to and including 50 weight % and has a glass transition temperature of less than 25° C.;

the one or more (c) additives further comprise an optical brightener that is present in an amount of at least 0.01 weight % and up to and including 2 weight %; and carbon black is present as at least one opacifying colorant in an amount of at least 0.003 weight % and up to and including 0.2 weight %, all amounts based on the total weight of the foamed aqueous composition.

The present invention provides a number of advantages. In addition to the advantages described in U.S. Ser. No. 15/144,875 (noted above), the present invention provides foamable and foamed aqueous compositions and foamed, opacifying elements (light-blocking articles) containing low amounts of opacifying colorants, which compositions and elements are not damaged by temperatures greater than 100° C. that may occur during the drying operations consistent with manufacture thereof. Moreover, the foamed, opacifying elements (such as light-blocking curtains and shades) according to the present invention exhibit desired opacity, bright and light coloration, and improved flexibility, "hand", and drapeability. Manufacturing operations can be readily carried out in a continuous manner for example, in a roll-to-roll operation using a web of porous substrate.

It highly important also to consider that the foamed, opacifying elements according to this invention can have simpler construction than light-blocking articles described in the prior art. For example, such elements can comprise a single dry opacifying layer that is both opacifying and light in color at the same time, disposed on a porous substrate compared to prior art articles that comprise two or more dry layers including a dry opacifying layer and a light-colored layer in a sandwich construction. Such multiple pass prior art constructions are designed necessarily to hide the black color of the opacifying colorant in the dry opacifying layer.

The present invention avoids such thick and expensive constructions while providing the noted advantages with very little opacifying colorant (for example, less than 1 weight % of total solids). Because the opacifying colorant can be contained within the porous particles and there is so little of the opacifying colorant used, the foamed, opacifying element remains light-colored and when it is damaged or punctured, the escape of opacifying colorant and its effect on other materials are minimized. Moreover, with very little opacifying colorant used according to the present invention, its impact to absorb infrared radiation (heat) and radiate that heat into the environment is minimized along with the pores that can scatter or reflect heat back towards its source. Thus, the elements according to the present invention assist the user to manage heat in environments where this is a major concern such as hospital rooms and in extreme climates.

In some embodiments, the foamed, opacifying elements prepared according to the present invention can comprise a single dry opacifying layer that has all of the antimicrobial, opacifying, and flame retardant properties.

DETAILED DESCRIPTION OF THE INVENTION

The following discussion is directed to various embodiments of the present invention and while some embodiments can be desirable for specific uses, the disclosed embodiments should not be interpreted or otherwise considered be limit the scope of the present invention, as claimed below. In addition, one skilled in the art will understand that the following disclosure has broader application than is explicitly described for any specific embodiment.

Definitions

As used herein to define various components of the foamed aqueous composition and foamable aqueous composition, or materials used to prepare the porous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "foamed, opacifying element," "element," and "article" are intended to refer to the same material.

Unless otherwise indicated, the terms "foamed aqueous composition" and "composition" are intended to refer to the same material.

The terms "porous particle" and "porous particles" are used herein, unless otherwise indicated, to refer to porous organic polymeric materials useful in the foamable aqueous compositions, foamed aqueous compositions, and foamed opacifying elements according to the present invention. The porous particles generally comprise a solid continuous polymeric phase having an external particle surface and discrete pores dispersed within the continuous polymeric phase. The continuous polymeric phase also can be chemically cross-linked or elastomeric in nature, or both chemically cross-linked and elastomeric in nature.

The continuous polymeric phase of the porous particles generally has the same composition throughout that solid phase. That is, the continuous polymeric phase is generally uniform in composition including any additives (for example, colorants) that can be incorporated therein. In addition, if mixtures of polymers are used in the continuous polymeric phase, generally those mixtures also are dispersed uniformly throughout.

The term "porogen" refers to a pore forming agent used to make porous particles for use in the present invention. For example, in the practice of the present invention, a porogen can be the aqueous phase of water-in-oil emulsions (that is in the first emulsion), along with a pore stabilizing hydrocolloid, or any other additive in the aqueous phase that can act as the template for creation of pores and modulate the porosity of the porous particles.

As used in this disclosure, the term "isolated from each other" refers to the different (distinct) pores of same or different sizes that are separated from each other by some of the continuous polymeric phase, and such pores are not generally interconnected.

The terms "first discrete pore" and "second discrete pore" refer to distinct sets of isolated pores in the porous particles. These first and second discrete pores can refer to distinct individual pores, or in most embodiments, they refer to distinct sets of pores. Each distinct set of pores includes a plurality of pores, each of which pores is isolated from others pores in the set of pores, and the pores of each set of pores are isolated from all other pores of the other sets of pores in the porous particle. Each set of pores can have the same mode average size or both sets can have the same mode average size. The word "discrete" is also used to define different droplets of the first and second aqueous phases when they are suspended in the oil (solvent) phase (described below).

The porous particles can include "micro," "meso," and "macro" discrete pores, which according to the International Union of Pure and Applied Chemistry, are the classifications recommended for discrete pore sizes of less than 2 nm, from 2 nm to 50 nm, and greater than 50 nm, respectively. Thus, while the porous particles can include closed discrete pores of all sizes and shapes (that is, closed discrete pores entirely within the continuous polymeric phase) providing a suitable volume in each discrete pore, macro discrete pores are particularly useful. While there can be open macro pores on the surface of the porous particle, such open pores are not desirable and can be present only by accident. The size of the porous particle, the formulation, and manufacturing conditions are the primary controlling factors for discrete pore size. However, typically the discrete pores independently have an average size of at least 100 nm and up to and including 7,000 nm, or more likely at least 200 nm and up to and including 2,000 nm. Whatever the size of the discrete pores, they are generally distributed randomly throughout the continuous polymeric phase. If desired, the discrete pores can be grouped predominantly in one part (for example, "core" or "shell") of the porous particles.

In some embodiments, where there are different sets of discrete pores, the discrete pores of a first set are predominantly nearer then external particle surface compared to the discrete pores of a second set. For example, a set of smaller discrete pores can be predominantly close to the external particle surface compared to a set of larger discrete pores. As used herein, the term "predominant" means that a larger number fraction of pores of one size is found in a "shell" area nearer the surface of the porous particle than one would expect based on the total number fraction of the two or more types (sizes) of pores present in the porous particle.

The porous particles used in this invention generally have a porosity of at least 20 volume % and up to and including 70 volume %, or likely at least 40 volume % and up to and including 65 volume %, or more typically at least 45 volume % and up to an including 60 volume %, all based on the total porous particle volume. Porosity can be measured by the known mercury intrusion technique.

"Opacity" is a measured parameter of a foamed, opacifying element according to the present invention that characterizes the extent of transmission of electromagnetic radiation such as visible light. A greater opacity indicates a more efficient blocking (hiding) of predetermined radiation (as described below). In the present invention, the "opacity" of a foamed, opacifying element is quantitated by measuring the "light blocking value" (LBV), described below with the Examples, which determines the extent to which the impinging radiation or light is blocked by the foamed, opacifying element. The higher the LBV, the greater the light blocking ability exhibited by the foamed, opacifying element. The LBV is at least 4 for the articles prepared using the present invention.

Glass transition temperatures of the organic polymers used to prepare the continuous polymeric phase can be measured using Differential Scanning calorimetry (DSC) using known procedures. For many commercially available organic polymers, the glass transition temperatures are known from the suppliers.

Polymer viscosity (in centipoises) comprising the continuous polymeric phase can be measured in ethyl acetate at concentration of 20 weight % of the polymer at 25° C. in an Anton Parr MCR 301 stress rheometer in a coquette using steady shear sweeps. Shear rate at 100 sec$^{-1}$ was calculated from the resulting graphical plot of viscosity vs. shear rate.

CIELAB L*, a*, and b* values described herein have the known definitions according to CIE 1976 color space or later known versions of color space and were calculated assuming a standard D65 illuminant. The Y tristimulus value of the X, Y, and Z tristimulus values was used as a measure of the luminous reflectance or "brightness" of a dry opacifying layer.

Uses

The foamable aqueous compositions and foamed aqueous compositions can be used to prepare foamed, opacifying elements that in turn can be useful as radiation blocking materials to provide blackout curtains, carpets, banners, and window shades for airplanes, labels, projection screens, textile fabrics, and packaging materials. The foamed, opacifying elements can also exhibit improved sound and heat blocking properties. The term "blackout curtain" is intended to include but not limited to, window curtains, shades for all purposes, draperies, room dividers, privacy curtains, and cubicle curtains suitable for various environments and structures. The foamed, opacifying elements exhibit blackout properties and can optionally have an opaque printable surface able to accept ink using in screen printing, inkjet printing, or other printing processes. Thus, one can provide opposing printable surfaces in such materials (elements) with the same opacity as if only one side was printed, with no printed image on one side showing through the other side.

Foamable Aqueous Compositions

The foamable aqueous compositions can be suitably aerated to provide foamed aqueous compositions, for example to prepare a foamed, opacifying element as described below. In many embodiments, the foamable aqueous compositions used in the present invention have five essential components, that is, the only components needed to obtain the properties of the foamed, opacifying element described herein: (a) porous particles as described below; (b) a binder material, also described below; (c) one or more additives as described below, comprising at least one surfactant; (d) water; and (e) an opacifying colorant different from all of the compounds of component (c), which opacifying colorant absorbs "predetermined electromagnetic radiation" (generally UV to near-IR, for example, absorbing the radiation of all wavelengths of from 350 nm to 800 nm or from 350 nm to and including 700 nm). Optional (non-essential) components that can be included are also described below.

The foamable aqueous composition according to this invention generally has at least 35% and up to and including 70% solids, or more particularly at least 40% and up to and including 60% solids.

Porous Particles:

Porous particles used in the present invention containing discrete pores (or compartments) are used in the opacifying layers and they are generally prepared, as described below, using one or more water-in-oil emulsions in combination with an aqueous suspension process, such as in the Evaporative Limited Coalescence (ELC) process. The details for the preparation of the porous particles are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), and U.S. Pat. No. 8,252,414 (Putnam et al.), the disclosures of all of which are incorporated herein by reference. Thus, the porous particles are generally polymeric and organic in nature (that is, the continuous polymeric phase is polymeric and organic in nature) and non-porous particles (having less than 5% porosity) are excluded. Inorganic particles can be present on the outer surface as noted below.

The porous particles are composed of a continuous polymeric phase derived from one or more organic polymers that are chosen so that the continuous polymeric phase has a glass transition temperature ($T_g$) of greater than 80° C., or more typically of at least 100° C. and up to and including 180° C., or more likely at least 110° C. and up to and including 170° C. as determined using Differential Scanning calorimetry. Polymers having a $T_g$ that is greater than 200° C. are typically less useful in the continuous polymeric phase.

In addition, the continuous polymeric phase comprises one or more polymers each of which has a viscosity of at least 80 centipoises and up to and including 500 centipoises at a shear rate of 100 sec$^{-1}$ as measured in ethyl acetate at a concentration of 20 weight % at 25° C. This feature is important to optimize the preparation of porous particles used in the practice of this invention so that the prepared porous particles have a narrow particle size distributions and high porosity.

For example, the continuous polymeric phase can comprise one or more polymers having the properties noted above, wherein generally at least 70 weight % and up to and including 100 weight % based on the total polymer weight in the continuous polymeric phase, is composed of one or more cellulose polymers (or cellulosic polymers) including but not limited to, those cellulosic polymers derived from one or more of cellulose acetate, cellulose butyrate, cellulose acetate butyrate, and cellulose acetate propionate. A polymer derived solely from cellulose acetate butyrate is particularly useful. Mixtures of these cellulose polymers can also be used if desired, and mixtures comprising a polymer derived from cellulose acetate butyrate as at least 80 weight % of the total of cellulose polymers (or of all polymers in the continuous polymeric phase) are particularly useful mixtures.

In general, the porous particles used in the present invention have a mode particle size equal to or less than 50 μm, or of at least 2 μm and up to and including 50 μm, or typically of at least 3 μm and up to and including 30 μm or even up to and including 40 μm. Most useful porous particles have a mode particle size of at least 3 μm and up to and including 20 μm. Mode particle size represents the most frequently occurring diameter for spherical particles and the most frequently occurring largest diameter for the non-spherical particles in a particle size distribution histogram.

Pore stabilizing materials such as hydrocolloids can be present within at least part of the volume of the discrete pores distributed throughout the continuous polymeric phase, which pore stabilizing materials are described in patents cited above. In some embodiments, the same pore stabilizing material is incorporated in essentially all of the discrete pores throughout the entire porous particles. In many embodiments, the pore stabilizing hydrocolloids are selected from the group consisting of carboxymethyl cellulose (CMC), a gelatin, a protein or protein derivative, polyvinyl alcohol and its derivatives, a hydrophilic synthetic polymer, and a water-soluble microgel.

It can be desired in some embodiments to provide additional stability of one or more discrete pores in the porous particles during their formation, by having one or more amphiphilic block copolymers disposed at the interface of the one or more discrete pores and the continuous polymeric phase. Such materials are "low HLB", meaning that they have an HLB (hydrophilic-lipophilic balance) value as it is calculated using known science, of 6 or less, or even 5 or less. The details of these amphiphilic polymers and their use in the preparation of the porous particles are provided in U.S. Pat. No. 9,029,431 (Nair et al.), the disclosure of which is incorporated herein by reference.

A particularly useful amphiphilic block copolymer useful in such embodiments comprises poly(ethyleneoxide) and poly(caprolactone) that can be represented as PEO-b-PCL. Amphiphilic block copolymers, graft copolymers and random graft copolymers containing similar components are also useful.

Such an amphiphilic block copolymer can be generally present in the porous particles in an amount of at least 1 weight % and up to and including 99.5 weight %, or at least 2 weight % and up to and including 50 weight %, based on total porous particle dry weight.

The porous particles used in this invention can be spherical or non-spherical depending upon the desired use. In a method used to prepare the porous particles, additives (shape control agents) can be incorporated into the first or second aqueous phases, or in the oil (organic) phase to modify the shape, aspect ratio, or morphology of the porous particles. The shape control agents can be added prior to or after forming the water-in-oil-in-water emulsion. In either case, the interface at the oil and second water phase is modified before organic solvent is removed, resulting in a reduction in sphericity of the porous particles. The porous particles used in the present invention can also comprise surface stabilizing agents, such as colloidal silica, on the outer surface of each porous particle, in an amount of at least 0.1 weight %, based on the total dry weight of the porous particle.

The average size of the discrete pores (or individually isolated and closed voids or compartments) is described above.

The porous particles can be provided as powders, or as aqueous suspensions (including water or water with water-miscible organic solvents such as alcohols). Such powders and aqueous suspensions can also include surfactants or suspending agents to keep the porous particles suspended or when rewetting them in an aqueous medium. A useful surfactant for this purpose, for example is a $C_{12}$-$C_{14}$ secondary alcohol derivative of poly(ethylene oxide) that can be commercially available as TERGITOL® 15-S-7 (Dow Chemical Corporation). The other compositional features are described in the incorporated description of methods for preparing the porous particles.

The porous particles are generally present in the foamable aqueous composition in an amount of at least 0.05 weight % and up to and including 15 weight %, or typically at least 0.5 weight % and up to and including 10 weight %, based on the total weight of the foamable aqueous composition (including water that is present), particularly when the porous particles have a mode size of at least 3 μm and up to and including 30 μm.

It is known in the art, that typical white inorganic pigments such as titanium dioxide block electromagnetic radiation by light scattering as a result of refractive index differences between the inorganic pigment particles and the surroundings influenced by the pigment particle size. Additionally, there is only so much volume that can be filled (0.635 of random close packing of monodispersed spheres) before interstitial cavities form between packed pigment particles.

The opacity of an opacifying layer is enhanced by interstitial voids that are formed when the particle volume concentration (PVC), typically pigment particles such as titanium dioxide, is above a critical level. The sizes of the interstitial voids for example between the pigment particles are smaller than the pigment particles themselves and decrease with increasing polydispersity of such pigment particles. Since the pigment particle sizes are optimized for maximum light scattering when dispersed in a polymeric matrix above the critical PVC, the interstitial voids created by the pigment particles will be too small to also optimally scatter light. Crowding occurs when the spacing between pigment particles decreases to the point where the light scattering becomes dependent on the concentration of the pigment particles and the effectiveness of scattering by the pigment particles is reduced as the pigment loading is increased. This is known as "dependent scattering," a phenomenon whereby the effective scattering diameter, or scattering zones, of pigment particles become effectively greater than their actual diameter. These scattering zones overlap as the concentration of scattering pigment particles increases, reducing scattering efficiency, and resulting in the crowding effect. Small and large pigment particle size extenders have been used in an attempt to create greater separation between the scattering pigment particles and to reduce the overlap of the scattering zones to result in greater scattering efficiency and opacity.

Advantageously, for the porous particles used in the present invention, the spacing between the light scattering discrete pores within the porous particles is controlled during the process of forming them and is not subject to subsequent formulation effects such as dependent scattering effects.

Optimal dry opacifying layers designed according to the present invention comprise: porous particles containing a small amount of an opacifying colorant as described below to enhance the light blocking capacity of the porous particles (particularly transmitted light blocking capacity); a binder material to hold the porous particles in place; and surfactants and other additives including optionally one or more tinting colorants that can be in other porous particles or dispersed within the layer. The foamed aqueous composition used to prepare the dry opacifying layer comprises foam cells that surround the porous particles.

Upon drying the foamed aqueous composition, the large mismatch in refractive index between the discrete pores of the porous particles in the dry opacifying layer and the polymer walls (continuous polymeric phase), and the dried foam cells, causes incident electromagnetic radiation passing through the dry opacifying layer to be scattered by the multiplicity of interfaces and discrete pores. The back scattered electromagnetic radiation can again be scattered and returned in the direction of the incident electromagnetic radiation thus reducing the attenuation and contributing to the opacifying power and brightness or luminous reflectance of the dry opacifying layer. If a small amount of electromagnetic radiation absorbing opacifying colorant is present in the porous particles of the dry opacifying layer, for example either in the discrete pores or in the continuous polymer phase of the porous particles, the opacifying power of the dry opacifying layer is increased. This is because the multiple scattering of electromagnetic radiation in the dry opacifying layer increases the path length of the electromagnetic radiation through the dry opacifying layer, thereby increasing the chance that the electromagnetic radiation will encounter the opacifying colorant in the dry opacifying layer and be blocked or absorbed by it.

A single dry opacifying layer present in embodiments according to the present invention comprises porous particles and a relatively low amount of a predetermined electromagnetic radiation absorbing opacifying colorant such as carbon black for creating electromagnetic radiation blocking coatings and the dry foam cells surrounded by the binder material. Multiple light scattering effects by and among the porous particles and the surrounding dry foam cells, increase the path of the radiation through the dry opacifying layer. The likelihood of radiation encountering an opacifying colorant is increased by this greater path length.

Some particularly useful porous particles comprise a continuous polymeric phase and a first set of discrete pores dispersed within the continuous polymeric phase, wherein:

each porous particle has a mode particle size of at least 3 µm and up to and including 30 µm, each porous particle has a porosity of at least 40 volume % and up to and including 65 volume %, the continuous polymeric phase comprises one or more polymers, at least 70 weight % of which are derived from one or more of cellulose acetate, cellulose butyrate, cellulose acetate butyrate, and cellulose acetate propionate such that the continuous polymeric phase has a glass transition temperature ($T_g$) of at least 110° C. and up to and including 170° C. as determined using Differential Scanning calorimetry, the average size of the discrete pores is at least 50 nm and up to and including 1000 nm, the porous particles further comprise a pore stabilizing hydrocolloid within at least part of the volume of the discrete pores, which pore stabilizing hydrocolloid is selected from the group consisting of carboxymethyl cellulose, a gelatin, a protein or protein derivative, polyvinyl alcohol or a derivative thereof, a hydrophilic synthetic polymer, and a water-soluble microgel, and the porous particles comprise one or more amphiphilic low HLB block copolymers disposed at the interface of one or more of the discrete pores and the continuous polymeric phase.

Binder Materials:

The foamable and foamed aqueous compositions used in the present also comprises one or more binder materials (that can behave as a "matrix" for all of the materials in the compositions and resulting dry opacifying layer) to hold the essential porous particles, additives, opacifying colorants, and any optional materials together upon application to the porous substrate and drying to form a dry opacifying layer.

It is particularly useful that the binder material have the following properties: (a) it is water-soluble or water-dispersible; (b) it is capable of forming a stable foamed aqueous composition with the essential and optional components described herein; (c) it is capable of being disposed onto a suitable substrate as described below; (d) it does not inhibit the aeration (foaming) process (described below); (e) it is capable of being dried and where desired also crosslinked (or cured); (f) it has good light and heat stability; (g) it is film-forming but contributes to the flexibility of the foamed, opacifying element and is thus not too brittle, for example having a $T_g$ of less than 25° C.

The choice of binder material can also be used to increase the laundering properties of the resulting foamed opacifying compositions in the foamed, opacifying elements. In addition, the binder material can be used to provide a supple feel to touch and flexibility especially when disposed on a porous substrate (for example, a fabric) that is meant for window coverings such as draperies. The binder material is useful in the foamed, opacifying element for binding together and adhering the porous particles and other materials in the dry foamed composition onto the porous substrate.

The binder material can include one or more organic polymers that are film forming and that can be provided as an emulsion, dispersion, or an aqueous solution, and that cumulatively provide the properties noted above. It can also include polymers that are self-crosslinking or self-curable, or it can include one or more polymers to which crosslinking agents are added and are thus curable or capable of being crosslinked (or cured) under appropriate conditions.

Thus, if the binder material is crosslinkable (or curable) in the presence of a suitable crosslinking agent, such crosslinking (or curing) can be activated chemically with heat, radiation, or other known means. A curing or crosslinking agent serves to provide improved insolubility of the resulting dry foamed composition, cohesive strength, and adhesion to the porous substrate. The curing or crosslinking agent is generally a chemical having functional groups capable of reacting with reactive sites in a binder material (such as a functionalized latex polymer) under curing conditions to thereby produce a crosslinked structure. Representative crosslinking agents include but are not limited to, multifunctional aziridines, aldehydes, methylol derivatives, and epoxides.

Useful binder materials include but are not limited to, poly(vinyl alcohol), poly(vinyl pyrrolidone), ethylene oxide polymers, polyurethanes, urethane-acrylic copolymers, other acrylic polymers, styrene-acrylic copolymers, vinyl polymers, styrene-butadiene copolymers, acrylonitrile copolymers, polyesters, silicone polymers, or a combination of two or more of these organic polymers. Such binder materials are readily available from various commercial sources or can be prepared using known starting materials and synthetic conditions. The binder material can be anionic, cationic or nonionic in net charge. A useful class of film-forming binder materials includes aqueous latex polymer dispersions such as acrylic latexes that can be ionic or nonionic colloidal dispersions of acrylate polymers and copolymers. For example, useful film-forming aqueous latexes include but are not limited to, styrene-butadiene latexes, poly(vinyl chloride) and poly(vinylidene chloride) latexes, poly(vinyl pyridine) latexes, poly(acrylonitrile) latexes, and latexes formed from N-methylol acrylamide, butyl acrylate, and ethyl acrylate. Examples of suitable commercially available binder materials include those sold by DSM under the trade names NEOREZ® A-1150, NEOCRYL® A-6093, by Dow under the trade name RHOPLEX® NW-1845K and by BASF under the tradenames BUTOFAN® N S144, and BUTOFAN® NS 222, by Lubrizol under the tradenames HYSTRETCH® and HYCAR®, and resins sold by Royal Adhesives such as PARANOL® AC-2032.

The binder material generally has a glass transition temperature that is less than 25° C., and more likely equal to or less than 0° C. Glass transition temperature can be determined using known procedures and such values are already known for many polymers useful as binder materials in this invention. The binder material desirably has adequate flexibility and tensile strength in order to maintain integrity upon handling, especially for use with porous textile substrates.

The one or more binder materials can be present in the foamable aqueous composition in an amount of at least 20 weight %, or at least 20 weight % and up to and including 60 weight %, or typically at least 30 weight % and up to and including 50 weight %, based on the total foamable aqueous composition (that is, the total weight of all components including water).

Additives:

The foamable aqueous compositions can include at least 0.0001, or at least 0.001 weight %, or even at least 0.01 weight %, and up to and including 2 weight %, or up to and including 5 weight %, or even up to and including 20 weight %, or even at least and including 30 weight % of one or more additives comprising at least one surfactant as defined below. Other useful additives include but are not limited to plasticizers, inorganic or organic pigments and dyes (for example, pigment or dye colorants different from the opacifying colorants described below), flame retardants, biocides, fungicides, antimicrobial agents, preservatives, pH buffers, optical brighteners, tinting colorants, metal particles such as metal platelets or metal flakes, thickeners, and inorganic fillers (such as clays) that are not any of the other additive materials or opacifying colorants described below. These amounts refer to the total of all of the one or more additives in a given foamable aqueous composition and are based on the total weight of those compositions (including water). There can be mixtures of each type of additive, or mixtures of two or more types of additives in each of these compositions.

Any of these additives or mixtures thereof, can be present within any location of the foamed aqueous composition, including but not limited to: the continuous polymeric phase; a volume of the first set (or other set) of discrete pores; or both the first set (or other set) of discrete pores and the continuous polymeric phase of the porous particles. Alternatively, the one or more additives can be present within the binder material alone, or both within the binder material and within the porous particles.

In all embodiments, the (c) additives useful in the present invention are not the same compounds as the (a) porous particles, (b) binder materials, and (d) opacifying colorants as described herein.

As noted above, at least one additive is a surfactant that is defined as a compound that reduces surface tension in a composition. In most embodiments of this invention, this essential surfactant is a foaming agent that functions to create and enhance foam formation. In many such embodiments, the one or more (c) additives comprise one or more foaming agents (surfactants) as well as one or more foam stabilizing agents that are also surface active agents that function to structure and stabilize the foam. Examples of useful foaming agents (surfactants) and foam stabilizing dispersing agents include but are not limited to, ammonium stearate, sodium lauryl sulfate, ammonium lauryl sulfate, ammonium sulfosuccinate, disodium stearyl sulfosuccinate, ethoxylated alcohols, ionic, nonionic or anionic agents such as fatty acid soaps or a fatty acid condensation product with an alkylene oxide, for example, the condensation product of ethylene oxide with lauryl or oleic acid or an ester of fatty alcohols and similar materials, many of which can be obtained from various commercial sources. Mixtures of foaming agents can be used if desired.

The relative amounts of each of these two types of (c) additives is not critical as long as the desired function is evident, that is suitable foaming properties as required to prepare the foamed aqueous composition of the present invention, and stability of that foamed aqueous composition during storage and manufacture of the foamed, opacifying elements. The optimal amounts of each of these additives can be determined by using routine experimentation and the teaching in the working Examples below.

Other useful (c) additives include metal particles that can be obtained from any available commercial source as metal flakes or metal platelets and in dry form or as a suspension. Such metal flakes or metal platelets are substantially 2-dimensional particles, having opposing main surfaces or faces separated by a relatively minor thickness dimension. The metal flakes can have a size range of at least 2 µm and up to and including 50 µm in main surface equivalent circular diameter (ECD) wherein the ECD is the diameter of a circle having the same area as the main face. Examples of useable metal flakes include those available from Ciba Specialty Chemicals (BASF) such as aluminum flakes that are available as METASHEEN 91-0410 in ethyl acetate, and copper flakes that can be obtained from various commercial sources. Further details of useful metal flakes are provided in Cols. 11-12 of U.S. Pat. No. 8,614,039 (Nair et al.), the disclosure of which is incorporated herein by reference. The metal particles described above, and particularly the metal flakes can be in the foamable aqueous composition in any suitable location but they are particularly useful when incorporated within the porous particles such as within the volume of the discrete pores of the porous particles.

Useful biocides (that is, antimicrobial agents or antifungal agents) that can be present as (c) additives include but are not limited to, silver metal (for example, silver particles, platelets, or fibrous strands) and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper metal (for example, copper particles, platelets, or fibrous strands) and copper-containing compounds such as copper chelates and copper salts can be present as (c) additives for biocidal purposes. Mixtures of any of silver metal, silver-containing compounds, copper metal, and copper-containing compounds, can also be present and used in this manner.

It can also be useful to include thickeners as (c) additives in order to modify the viscosity of the foamable aqueous composition and to stabilize it as long as aeration is not inhibited. A skilled worker can optimize the viscosity so as to obtain optimal aeration conditions and desired foam density as described below. Useful thickeners can be utilized to control the rheology of the foamable aqueous composition depending upon the method used to form the dry opacifying layer on a porous substrate as described below. Particularly useful rheology modifiers are RHEOVIS® PU 1214 (BASF) and ACRYSOL® G111 (Dow Chemical Company).

Particularly useful (c) additives comprise one or more tinting colorants that can be used to provide a specific observable color, coloration, or hue in the resulting foamed, opacifying elements. These materials are not chosen to provide the opacifying property described below for the opacifying colorants and thus, tinting colorants are intended to be different materials than the opacifying colorants.

Mixtures of tinting colorants can be present in the foamable aqueous compositions and they can be different in composition and amount from each other. The desired coloration or hue can be obtained using specific tinting colorants can be used in combination with opacifying colorant(s) described below to offset or modify the original color of a foamed, opacifying element (without such materials) to provide more whiteness (or brightness) in the final "color" (or coloration). The one or more tinting colorants can be incorporated within the porous particles (either within the volume of discrete pores, within the continuous polymeric phase, or in both places) or they can be uniformly dispersed within the binder material. In some embodiments, a tinting colorant can be incorporated within the same porous particles that also include an opacifying colorant (as described below). Alternatively, one or more tinting colorants can be present within both the porous particles (in a suitable location) and within the binder material.

In some embodiments, a first population of porous particles described herein comprising opacifying colorants as described below, and another population of porous particles described herein comprising tinting colorants can be mixed with the first population of porous particles. The two sets of porous particles can comprise the same or different polymers in the continuous polymeric phase.

The one or more tinting colorants can be present in the foamable aqueous composition in an amount of at least 0.0001 weight %, or more typically at least 0.001 weight %, and up to and including 3 weight %, based on the total weight of the foamable aqueous composition (including water). Tinting colorants can be dyes or organic pigments that are soluble or dispersible in organic solvents and polymers that are used for making the porous particles and thus can be included within the oil phase used to prepare such porous particles. Alternatively, the tinting colorants can be primarily water-soluble or water-dispersible materials and included into an aqueous phase used to prepare the porous particles.

It can also be useful to include one or more optical brighteners as (c) additives to increase the whiteness (brightness or "fluorescent" effect) of the final coloration in the foamed, opacifying element. Optical brighteners are sometimes known in the art as "fluorescent whiteners" or "fluorescent brighteners." In general, such materials are organic compounds selected from classes of known compounds such as derivatives of stilbene and 4,4'-diaminostilbene (such as bistriazinyl derivative); derivatives of benzene and biphenyl (such as styril derivatives); pyrazolines; derivatives of bis (benzoxazole-2-yl); coumarins; carbostyrils; naphthalimides; s-triazines; and pyridotriazoles. Specific examples of optical brighteners can be found in various publications including "Fluorescent Whitening Agents," Kirk-Othmer *Encyclopedia of Chemical Technology, Fourth Edition*, volume 11, Wiley & Sons, 1994. One of more of such compounds can be present in an amount of at least 0.01 weight % and up to and including 2 weight %, all based on the total weight of the foamable aqueous composition (including water).

When present, one or more optical brighteners can be in one or more locations in the foamed aqueous composition. For example, an optical brightener can be present in the binder material. Alternatively, an optical brightener can be present within: the continuous polymeric phase of the porous particles; a volume of the first set (or any other set) of discrete pores in the porous particles; or both in a volume of the first set (or any other set) of discrete pores and the continuous polymeric phase, of the porous particles.

In many useful embodiments, the (c) additives comprise two or more materials selected from surfactant that is a foaming agent, a foam stabilizing agent, a tinting agent, an optical brightener, flame retardants, an antimicrobial agent, and an inorganic filler (such as a clay).

Water:

Water is the primary solvent used in the foamable aqueous compositions used in the present invention. By "primary" is meant that of the total weight of solvents, water comprises at least 75 weight %, and more likely at least 80 weight % and up to and including 100 weight % of the total solvent weight. Auxiliary solvents that can be present must not adversely affect or harm the other components in the composition, namely the porous particles, binder materials, one or more additives, and opacifying agents. Nor must such auxiliary solvents adversely affect formation of the foamable aqueous composition or its use to prepare a foamed, opacifying element. Such auxiliary solvents can be water-miscible organic solvents such as alcohols and ketones.

The solvents then, primarily water, comprise at least 30 weight % and up to and including 65 weight %, or typically at least 40 weight % and up to and including 60 weight %, of the total weight of the foamable aqueous composition.

Opacifying Colorants:

The opacifying colorants used in the present invention can be a single colorant or chosen from any suitable combination of colorants such that the single or multiple colorants form the "opacifying colorant" that absorbs predetermined electromagnetic radiation (defined above) to provide blackout properties (or suitable opacity). Opacifying colorants can be soluble dyes or pigments or combinations of each or both types of materials. The opacifying colorants are different from all of the compounds defined above as the (c) additives.

In most embodiments, the one or more opacifying colorants are present within a volume of the first set (or another set) of discrete pores within the porous particles, within the continuous polymeric binder of the porous particles, or within both the volume of the first set (or another set) of discrete pores and the continuous polymeric binder of the porous particles. This is highly advantageous as the porous particles can be used to "encapsulate" various opacifying colorants as well as tinting colorants and other (c) additives so they are kept isolated from the other components of the foamable aqueous composition and are additionally not exposed to the environment during sewing or upon surface damage of the foamed, opacifying element. However, in some embodiments, it can be useful to incorporate opacifying agents solely or additionally within the binder material in which the porous particles are dispersed.

As used herein, an "opacifying colorant" includes one or more colorant materials that are chosen, individually or in combination, to provide the blocking of predetermined electromagnetic radiation (as described above). While the opacifying colorants can provide some coloration or desired hue, they are not purposely chosen for the purpose and are thus materials that are chosen to be different from the tinting colorants described above.

Examples of opacifying colorants that can be used individually or in combination include but are not limited to, neutral or black pigments or dyes, a carbon black, black iron oxide, graphite, aniline black, anthraquinone black, and combinations of colored pigments or dyes such as combinations of two or more cyan, magenta, green, orange, blue, red, and violet dyes. The present invention is not limited to only the specific opacifying colorants described herein but these are considered as representative and as suitable guidance for a skilled worker to devise other combinations of opacifying colorants for the desired absorption in the predetermined electromagnetic radiation. A carbon black or a neutral or black pigment or dye (or combination thereof) is particularly useful as an opacifying colorant, of which there are many types available from commercial sources. Combinations of dyes or pigments such as a combination of the subtractive primary colored pigments (cyan, magenta, and yellow colored pigments) can also be used to provide a "black" or visually neutral opacifying colorant.

The opacifying colorant can be generally present in the foamable aqueous composition in an amount of at least 0.001 weight % and up to and including 0.5 weight %, or even at least 0.003 weight % and up to and including 0.2 weight %, all based on the total weight of the foamable aqueous composition (including the weight of solvent). These amounts refer to the total amount of one or a mixture of opacifying colorants. For example, as noted above, an opacifying colorant can comprise a combination of two or more component colorants (such as a combination of dyes or a combination of pigments) designed in hues and amounts so that the combination meets the desired properties described herein.

In particular embodiments, the opacifying colorant is a carbon black that is present in an amount of at least 0.003 weight % and up to and including 0.2 weight %, based on the total weight of the foamable aqueous composition.

In some embodiments, the opacifying colorants, if in pigment form, are generally milled to a fine particle size and then encapsulated within the volume of the discrete pores of the porous particles by incorporating the milled pigment within an aqueous phase used in making the porous particles. Alternatively, the opacifying colorant can be incorporated within the continuous polymeric phase of the porous particles by incorporating the opacifying colorant in the oil phase used in making the porous particles. Such arrangements can be achieved during the manufacture of the porous particles using the teaching provided herein and teaching provided in references cited herein.

In some embodiments, it can be useful to incorporate or dispose at least 95% (by weight) of the total opacifying colorant (or combination of component colorants) within the porous particles (either in the volume of the discrete pores, continuous polymeric phase, or both), and to incorporate the remainder, if any, within the binder material. However, in many embodiments, 100 weight % of the opacifying colorant is incorporated within the porous particles. For example, more than 50 weight % of the total opacifying colorant can be disposed or incorporated within the continuous polymeric phase of the porous particles, and the remainder can be incorporated within the volume of the discrete pores.

The opacifying colorants useful in the practice of this invention can be incorporated into the volume of the discrete pores of individual porous particles for example, by incorporating them in a first water phase to form a water-in-oil emulsion or in the continuous polymeric phase of the individual porous particles by incorporating them in the oil phase. In a particular embodiment, an opacifying colorant can be incorporated into the first aqueous phase in the form of a milled solid particle dispersions of the opacifying colorant. Preparation of milled solid particle dispersions can include combining the opacifying colorant particles to be reduced in size with a dispersant and a liquid medium such as water or ethyl acetate (when the opacifying colorant is incorporated in the continuous polymeric phase of the particle) in which the porous particles are to be dispersed, in a suitable grinding mill in which the porous particles are reduced in size and dispersed. The dispersant, an important ingredient in the milling, can be chosen to allow the opacifying colorant particles to be milled in the liquid medium down to a size small enough for incorporation into the discrete pores of the porous particles. The dispersants can be selected to obtain efficient opacifying colorant particle size reduction during milling, provide good colloidal stability of the opacifying colorant particles to prevent agglomeration after milling and impart the desired properties of the final foamed aqueous composition containing the opacifying colorants and the porous particles containing them. Alternatively, the opacifying colorant also can be incorporated in the continuous polymeric phase as a master batch of the opacifying colorant and an appropriate resin.

Foamed Aqueous Compositions

Foamed aqueous compositions can be prepared using the procedures described below wherein an inert gas (such as air) is mechanically incorporated into the foamable aqueous composition as described above, which procedures are designed to provide a foam density of at least 0.1 g/cm$^2$ and up to and including 0.5 g/cm$^3$, or more likely of at least 0.15 g/cm$^3$ and up to and including 0.4 g/cm$^3$. Foam density can be determined gravimetrically by weighing a known volume of the foamed aqueous composition.

The foamed aqueous composition according to this invention generally has at least 35% solids and up to and including 70% solids, or more particularly at least 40% solids and up to and including 60% solids.

The essential components (a) through (f) of the foamed aqueous composition are generally present in the same amounts as in the foamable aqueous composition (described above) as the foaming process does not appreciably add to or diminish the amounts of such components.

For example, the (a) porous particles (as described above) can be present in the foamed aqueous composition in an amount of at least 0.05 weight % and up to and including 15 weight %, or typically of at least 0.5 weight % and up to and including 10 weight %, based on the total weight of the foamed aqueous composition.

One or more (b) binder materials (as described above) can be present in an amount of at least 20 weight %, or at least 25 weight % and up to and including 70 weight % or typically of at least 30 weight % and up to and including 50 weight %, based on the total weight of the foamed aqueous composition. In addition, one or more of the binder materials in the foamed aqueous composition can be curable.

One or more (c) additives (as described above) can be present in an amount of at least 0.0001 weight % and up to and including 30 weight % or typically of at least 0.001 weight %, or even at least 0.01 weight %, and up to and including 20 weight %, based on the total weight of the foamed aqueous composition. At least one of the (c) additives is a surfactant as described above, and in particularly useful embodiments, the (c) additives comprise a foaming agent and a foam stabilizing agent. Other useful (c) additives can be present as noted above for the foamable aqueous compositions, also in the amounts noted above. For example, some particularly useful embodiments of the foamed aqueous composition, the (c) additives comprise two or more materials selected from surfactant that is a foaming agent, a surfactant that is a foam dispersing agent, a tinting agent, an optical brightener, a flame retardant, an antimicrobial agent, and an inorganic filler (such as a clay).

Water is also present as the predominant solvent (at least 75 weight % of total solvent weight), and all of the solvents that are present in an amount of at least 30 weight % and up to and including 70 weight %, or typically at least 40 weight % and up to and including 60 weight %, based on the total weight of the foamed aqueous composition.

The (e) opacifying colorants (as described above) are generally present in any suitable amount to provide the desired appearance, coloration, and opacity in the resulting foamed (and dried) opacifying element, In many embodiments, the one or more opacifying colorants can be present in an amount of at least 0.001 weight % or at least 0.001 weight % and up to and including 0.5 weight %, or even in an amount of at least 0.003 weight % and up to and including 0.2 weight %, especially when the opacifying colorant is a carbon black, all weights based on the total weight of the foamed aqueous composition.

In some embodiments, the foamed aqueous composition comprises at least 0.5 weight % and up to and including 10 weight % of the porous particles (as described above) that have a mode particle size of at least 3 µm and up to and including 30 µm, the amount based on the total weight of the foamed aqueous composition. In addition, discrete pores in such porous particles can have an average pore size of at least 100 nm and up to and including 7000 nm.

Moreover, the foamed aqueous composition can further comprise at least 0.001 weight % of the opacifying colorant (described above) within the porous particles. For example, some opacifying colorant can be a carbon black and present in an amount of at least 0.003 weight % and up to and including 0.2 weight % based on the total weight of the foamed aqueous composition.

Such opacifying colorant can be within: (i) the continuous polymeric phase of the porous particles; (ii) a volume of the first set (or additional set) of discrete pores; or (iii) both the volume of the first set (or additional set) of discrete pores and the continuous polymeric phase of the porous particles.

In some embodiments of the foamed aqueous composition, porous particles can be used that further comprise at least a second set of discrete pores (different from a "first" set of discrete pores) and an opacifying colorant or a tinting colorant can be present within: the continuous polymeric phase, the volume of the second set of discrete pores, or in both the continuous polymeric phase and the volume of the second set of discrete pores. First and second sets (or additional sets) of discrete pores can be incorporated into the porous particles using manufacturing technology described in several references cited above, including U.S. Pat. No. 8,110,628 (Nair et al.).

Foamed, Opacifying Elements

Foamed, opacifying elements can be prepared using methods described below according to the present invention. Such articles comprise a porous substrate and at least one dry foamed composition disposed on at least one supporting side of the porous substrate to form a dry opacifying layer. As described in more detail, each porous substrate has two supporting (planar) sides, that is, a first supporting side and a second opposing supporting side.

Each of the dry foamed compositions is derived from a foamed aqueous composition described above according to the present invention. In all embodiments, each dry foamed composition comprises at least the following essential components (a) through (e) and amounts, all of which are described in more detail above.

Component (a) porous particles are present in an amount of at least 0.1 weight % and up to and including 40 weight % or at least 0.5 weight % and up to and including 10 weight % of porous particles that are described in detail above, the amounts based on the total weight of the dry foamed composition, particularly when the porous particles have a mode particle size of at least 2 µm and up to and including 50 µm (or at least 3 µm and up to and including 30 µm) and the first set of discrete pores of the porous particles have an average pore size of at least 100 nm and up to and including 7,000 nm.

In addition, the dry foamed composition includes component (b) binder material in an at least partially cured or crosslinkable form, which is at least 10 weight % and up to and including 70 weight %, or at least 20 weight % and up to and including 60 weight % of one or more at least partially cured binder materials. Such at least partially cured binder materials are derived by at least partial curing or crosslinking (described below) of the binder materials described above. The noted amounts are based on the total weight of the dry foamed composition. Each of the one or more binder materials has a $T_g$ of 25° C. or less, or 0° C. or less.

One or more (c) additives, at least one is a surfactant, are present in an amount of at least 0.2 weight % and up to and including 50 weight %, or at least 1 weight % and up to and including 45 weight %, such additives being selected from the group consisting of foaming agents, foam stabilizing agents, plasticizers, inorganic or organic pigments and dyes (for example, pigment or dye colorants different from the opacifying colorants described below), flame retardants, antimicrobials, fungicides, preservatives, pH buffers, optical brighteners, tinting colorants, metal particles such as metal platelets or metal flakes, thickeners, and inorganic fillers (such as clays) that are not any of the other additive materials or opacifying colorants described herein, all of which additives are described in more detail above. The amounts are based on the total weight of the dry foamed composition. As noted above, most embodiments include at least one surfactant that is a foaming agent and at least one foam stabilizing agent.

Particularly useful one or more (c) additives comprise two or more materials selected from a foaming agent, a foam stabilizing agent, a tinting colorant, an optical brightener, a flame retardant, an antimicrobial agent, and an inorganic filler (such as a clay).

Thus, the foamed, opacifying element can comprise one or more tinting colorants as (c) additives in the dry foamed composition in an amount of at least 0.0001 weight % and up to and including 3 weight %, based on the total weight of the dry foamed composition. Such tinting colorant(s) can be present in at least the porous particles, and can be elsewhere also.

It is also useful to include one or more optical brighteners as (c) additives in an amount of at least 0.001 weight % and up to and including 0.4 weight %, based on the total weight of the dry foamed composition.

The dry foamed composition is "substantially" dry in nature, meaning that it comprises less than 5 weight %, or even less than 2 weight %, of aqueous medium (including water and any other solvents), based on the total weight of the dry foamed composition. This amount may not include any water that can be present in the discrete pores of the porous particles. The dry foamed composition in the dry opacifying layer generally comprises at least 90% solids, or at least 95% solids, or even at least 98% solids.

The dry foamed composition can also contain at least 0.002 weight %, or even at least 0.02 weight % and up to and including 2 weight % or up to and including 1 weight %, of one or more (e) opacifying colorants (as described above), which opacifying colorants absorb all wavelengths of the predetermined electromagnetic radiation (as defined above). Details of such opacifying colorants are described above, and the amounts are based on the total weight of the dry foamed composition. Such opacifying colorants can be present within the (a) porous particles or within the (b) binder material, or within both (a) and (b) components.

In some embodiments, a carbon black is present as the (e) opacifying colorant in an amount of at least 0.002 weight % and up to and including 1 weight %, based on the total weight of the dry foamed composition.

In many embodiments of the foamed, opacifying element, the opacifying colorant (such as a carbon black) can be present within: the continuous polymeric phase of the porous particles; a volume of the first set (or additional set) of discrete pores; or both the volume of the first set (or additional set) of discrete pores and the continuous polymeric phase of the porous particles.

The foamed, opacifying elements are designed particularly to have a single dry opacifying layer with the components disposed on the porous substrate so that the single dry opacifying layer in a given element exhibits a light blocking value of at least 4 or more likely at least 5. For this purpose, light blocking value can be determined as described above.

In addition, such dry opacifying layers exhibit a luminous reflectance (opacity) that is greater than 40%, as measured for the Y tristimulus value. For this purpose, luminous reflectance (brightness) is determined as described above.

Dry porous substrates useful in the practice of the present invention can comprise various porous materials such as woven and nonwoven textile fabrics composed of nylon, polyester, cotton, aramide, rayon, polyolefin, acrylic wool, porous glasses, fiberglass fabrics, or felt or mixtures thereof, or porous polymeric films [such as porous films derived from triacetyl cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbornene, polymethylpentene, polyether ketone, (meth)acrylonitrile], porous paper or other porous cellulosic materials, canvases, porous wood, porous plaster and other porous materials that would be apparent to one skilled in the art. The porous substrates can vary in dry thickness as long as they are suitable for the desired foamed, opacifying element. In most embodiments, the dry porous substrate thickness is at least 50 μm. Particularly useful porous substrates comprise a porous textile web (such as a flexible porous textile web), a porous polymer film (such as a woven polyester fabric), a porous cellulosic material (such as porous papers), a porous ceramic material, or a porous glass material.

The porous substrates can be surface treated by various processes including corona discharge, glow discharge, UV or ozone exposure, flame, or solvent washing in order to promote desired physical properties.

Generally, the foamed opacifying elements according to this invention are designed with a single dry opacifying layers disposed on one or both supporting (planar) sides of the porous substrate as described above. In many useful embodiments, a single dry opacifying layer is disposed on only one supporting sides of the porous substrate using techniques described below, and in such embodiments, the dry opacifying layer can be the only (outermost) layer disposed on the porous substrate.

In other embodiments, a dry opacifying layer can be disposed or formed on one or both supporting sides of a porous substrate, which dry opacifying layer can be formed using a foamable aqueous composition that is designed according to the present invention. In such embodiments, a dry non-opacifying layer can be disposed on the single dry opacifying layer (on one or both supporting sides of the porous substrate). Such dry non-opacifying layer can be designed with any of the components (a) through (c), but it does not comprise an (e) opacifying colorant as defined herein. Examples of useful dry non-opacifying layers can be designed to have various functions such as surface protection, antimicrobial properties, and color modification.

Attractive finishes can be imparted to the foamed, opacifying element by for example, flocking the foamed aqueous composition that is disposed on the porous substrate. Flock or very short (0.2 mm and up to several mm) fibers can be disposed in the foamed aqueous composition using either by electrostatic or mechanical techniques on the outermost surface of the foamed aqueous composition before or during drying.

Method of Making Foamed, Opacifying Elements

The foamed, opacifying elements are prepared by firstly providing a foamable aqueous composition as described above comprising essential components (a) through (e) in the described amounts.

This foamable aqueous composition is then aerated to provide a foamed aqueous composition having a foam density of at least 0.1 g/cm$^3$ and up to and including 0.5 g/cm$^3$, or of at least 0.15 g/cm$^3$ and up to and including 0.4 g/cm$^3$. This aeration procedure can be carried out using any suitable conditions and equipment that would be readily apparent to one skilled in the art in order to create a "foam" in the presence of a foaming agent as the (c) additive surfactant described above. For example, aeration can be carried out by mechanically introducing air or an inert gas (such as nitrogen or argon) in a controlled manner. High shear mechanical aeration can be carried out using sonication or high speed mixers, such as those equipped with a cowles blade, or with commercially available rotorstator mixers with interdigitated pins such as an Oakes mixer or a Hobart mixer, by introducing air under pressure or by drawing atmospheric air into the foamable aqueous composition by the whipping action of the mixer. Suitable foaming equipment can be used in a manner to provide the desired foam density with modest experimentation. It can be useful to chill or cool the foamable aqueous composition below ambient temperature to increase its stability by increasing its viscosity, and to prevent collapse of the foamable aqueous composition. This chilling operation can be carried out immediately before, after, or during the aeration procedure. Stability of the foamed aqueous composition can also be enhanced by the presence of a foam stabilizing agent as another of the (c) additives.

Once the foamed aqueous composition has been formed, it can be disposed onto one or more supporting sides (or planar surfaces) of a suitable porous substrate (described above). This procedure can be carried out in any suitable manner that does not undesirably diminish the foam density (or foam structure) of the foamed aqueous composition. For example, a planar surface of the porous substrate can be coated with the aqueous foamed composition using any suitable known coating equipment (floating knife, hopper, blade, or gap) and coating procedures including but not limited to blade coating, gap coating, slot die coating, X-slide hopper coating, or "knife-over-roll" operation, especially if multiple layers are applied to the substrate. If the dry opacifying layer is the only layer to be formed on the substrate, the foamed aqueous composition can be applied using blade coating, gap coating, slot die coating, or "knife-over-roll" coating. For example, useful layer forming (coating) means are described in U.S. Pat. No. 4,677,016 (Ferziger et al.), the disclosure of which is incorporated herein by reference.

Thus, the foamable aqueous composition can be disposed directly onto an outer surface of the porous substrate ("directly" means no intervening or intermediate layers) such as a porous woven cloth fabric, a fiberglass fabric, or cellulosic material.

When multiple layers are to be disposed on the porous substrate, a single dry opacifying layer can be disposed on the porous substrate and an outermost non-opacifying layer can be disposed on the dry opacifying layer using a suitable coating means as described above.

Once each foamed aqueous composition has been disposed on a planar surface of the porous substrate, it is generally dried to become "substantially" dry (to be defined in relation to the amount of water that is present, as described above for the dry foamed composition), and at least partially cured (meaning the one or more binder materials are at least partially cured or crosslinked), simultaneously or in any order, to provide a dry foamed composition (and dry opacifying layer) on either or both supporting sides of the porous substrate (preferably on only one supporting side of the porous substrate). Drying and at least partial curing can be accomplished by any suitable means such as by heating with warm or hot air, microwaves, or IR irradiation at a temperature and time sufficient for at least drying and at least partial curing (for example, at less than 180° C.). Curing the binder materials can be promoted by heat or radiation or other conditions to which the binder materials are responsive for crosslinking. In some embodiments, a suitable functionalized latex composition is used as the binder material. Upon heating, the binder material(s) dries, and a possible curing or crosslinking reaction taking place between reactive side groups of suitable curable polymer chains. If the particular binder material is not itself heat reactive, suitable catalysts or curing (crosslinking) agents can be added to the foamable aqueous composition to promote curing or crosslinking.

After drying and at least partially curing, the dry foamed composition on the porous substrate is then crushed or densified on the porous substrate to form a dry opacifying layer in the foamed, opacifying element. This process can be carried out in any suitable manner but it is generally carried out by a process that provides pressure to the dry foamed composition on the porous substrate, for example, by passing the porous substrate with the dry foamed composition through a compression calendering operation, pressing operation, or embossing operation, or a combination thereof. For example, the coated porous substrate can be passed through a combination of calendering and embossing rollers to reduce the thickness of the dry foamed composition and to densify the foam in the dry foamed composition. The thickness of the dry foamed composition can be reduced by at least 20% during such an operation. This process of crushing the dry foamed composition can be considered a "densifying operation" as the dry foamed composition is made denser while it is pressed together on the porous substrate. The thickness of the dry foamed composition before and after crushing (densifying) can be determined by a known technique such as laser profilometry. After drying and crushing, the foamed, opacifying element according to the present invention generally has a light blocking value of at least 4, or at least 5, which LBV is determined as described above.

It is also possible to provide an embossed design on the outermost layer, for example, the dry opacifying layer or dry non-opacifying layer, of the foamed, opacifying element during the densifying operation such as for example, by patterned embossing or calendering the dry outermost layer, to create selected regions of high or low opacity and thickness. The resulting embossed design can be viewed from either side in transmission.

It is further possible to print images on the outer surface of the outermost layer, such as the dry opacifying layer or dry non-opacifying layer of the foamed, opacifying element or on the backside of the porous substrate, or on both, using any suitable printing means such as inkjet printing or flexographic printing, thereby forming printed images of text, pictures, symbols, other objects, or combinations thereof. Such printed images can be visible, or they can invisible to the unaided eye (for example, using fluorescent dyes in the printed images). Alternatively, the outermost layer can be covered by printing or other means, with a colorless layer to provide a glossy finish.

The crushing or densifying process described above can be carried out at any suitable temperature including room temperature (for example, 20° C.) and up to and including 90° C., or more likely at a temperature of at least 20° C. and up to and including 80° C.

After densifying the dry foamed composition in the dry opacifying layer, the dry opacifying layer can be subjected to conditions that promote further curing such as those conditions that are described above for the initial drying/curing operations.

The present invention provides at least the following embodiments and combinations thereof, but other combinations of features are considered to be within the present invention as a skilled artisan would appreciate from the teaching of this disclosure:

1. A foamable aqueous composition that has at least 35% solids and up to and including 70% solids, and comprises:

(a) at least 0.05 weight % and up to and including 15 weight % of porous particles, each porous particle comprising a continuous polymeric phase and a first set of discrete pores dispersed within the continuous polymeric phase, the porous particles having a mode particle size of at least 2 μm and up to and including 50 μm and a porosity of at least 20 volume % and up to and including 70 volume %, and the continuous polymeric phase having a glass transition temperature greater than 80° C. and comprising a polymer having a viscosity of at least 80 centipoises and up to and including 500 centipoises at a shear rate of 100 sec$^{-1}$ in ethyl acetate at a concentration of 20 weight % at 25° C.;

(b) at least 20 weight % of a binder material;

(c) at least 0.0001 weight % of one or more additives comprising at least one surfactant;

(d) water; and (e) at least 0.001 weight % of an opacifying colorant different from all of the one or more (c) additives, which opacifying colorant absorbs predetermined electromagnetic radiation, all amounts based on the total weight of the foamable aqueous composition, wherein the foamable aqueous composition can provide a dry opacifying layer having a light blocking value of at least 4 as well as a luminous reflectance that is greater than 40% as measured by the Y tristimulus value.

2. A foamed aqueous composition that has at least 35% solids and up to and including 70% solids, and comprises:

(a) at least 0.05 weight % and up to and including 15 weight % of porous particles, each porous particle comprising a continuous polymeric phase and a first set of discrete pores dispersed within the continuous polymeric phase, the porous particles having a mode particle size of at least 2 μm and up to and including 50 μm and a porosity of at least 20 volume % and up to and including 70 volume %, and the continuous polymeric phase having a glass transition temperature greater than 80° C. and comprising a polymer having a viscosity of at least 80 centipoises and up to and including 500 centipoises at a shear rate of 100 sec$^{-1}$ in ethyl acetate at a concentration of 20 weight % at 25° C., (b) at least 20 weight % of a binder material;

(c) at least 0.0001 weight % of one or more additives comprising at least one surfactant;

(d) water; and (e) at least 0.001 weight % of an opacifying colorant different from all of the one or more (c) additives, which opacifying colorant absorbs predetermined electromagnetic radiation, all amounts based on the total weight of the foamed aqueous composition, and wherein the foamed aqueous composition having a foam density of at least 0.1 g/cm$^3$ and up to and including 0.5 g/cm$^3$, and the foamed aqueous composition can provide a dry opacifying layer having a light blocking value of at least 4 as well as a luminous reflectance that is greater than 40% as measured by the Y tristimulus value.

3. The foamed aqueous composition of embodiment 2 having a foam density of at least 0.15 g/cm$^3$ and up to and including 0.4 g/cm$^3$.

4. Any of embodiments 1 to 3, wherein the continuous polymeric phase comprises one or more cellulose polymers.

5. Any of embodiments 1 to 4, wherein the continuous polymeric phase comprises at least 70 weight %, based on the total polymer weight in the continuous polymeric phase, of one or more polymers derived from one or more of cellulose acetate, cellulose butyrate, cellulose acetate butyrate, and cellulose acetate propionate.

6. Any of embodiments 1 to 5, wherein the opacifying colorant is a carbon black that is present in an amount of at least 0.003 weight % and up to and including 0.2 weight %, based on the total weight of the foamable aqueous composition.

7. Any of embodiments 1 to 6, comprising at least 0.5 weight % and up to and including 10 weight % of the porous particles that have a mode particle size of at least 3 μm and up to and including 30 μm, based on the total weight of the foamable aqueous composition.

8. Any of embodiments 1 to 9, wherein the porous particles have a mode particle size of at least 3 μm and up to and including 20 μm.

9. Any of embodiments 1 to 8 having at least 40% solids and up to and including 60% solids, and wherein:

the continuous polymeric phase comprises at least 70 weight % and up to and including 100 weight %, based on the total polymer weight in the continuous polymeric phase, of one or more polymers derived from one or more of cellulose acetate, cellulose butyrate, cellulose acetate butyrate, and cellulose acetate propionate;

the porous particles are present in an amount of at least 0.5 weight % and up to and including 10 weight %;

the binder material is present in an amount of at least 30 weight % and up to and including 50 weight % and has a glass transition temperature of less than 25° C.;

the one or more (c) additives further comprise an optical brightener in an amount of at least 0.01 weight % and up to and including 2 weight %; and carbon black is present as at least one opacifying colorant in an amount of at least 0.003 weight % and up to and including 0.2 weight %, all amounts being based on the total weight of the foamable aqueous composition.

10. Any of embodiments 1 to 9, wherein the one or more (c) additives further comprise an optical brightener that is present within:

the continuous polymeric phase of the porous particles; a volume of the first set of discrete pores; or both the volume of the first set of discrete pores and the continuous polymeric phase of the porous particles.

11. Any of embodiments 1 to 10, wherein the one or more (c) additives further comprise metal flakes that are present within the porous particles.

12. Any of embodiments 1 to 11, wherein the at least one surfactant of the one or more (c) additives is a foaming agent and the one or more (c) additives further comprise a foam stabilizing agent.

13. Any of embodiments 1 to 12, wherein the one or more (c) additives further comprise a tinting colorant that is present in an amount of at least 0.0001 weight % and up to and including 3 weight %, based on the total weight of the foamable aqueous composition.

14. Any of embodiments 1 to 13, wherein the one or more (c) additives comprise an optical brightener in an amount of at least 0.01 weight % and up to and including 2 weight %, based on the total weight of the foamable aqueous composition.

15. Any of embodiments 1 to 14, wherein the one or more (c) additives comprise two or more materials selected from a foaming agent, a foam stabilizing agent, a tinting colorant, an optical brightener, a flame retardant, an antimicrobial agent, and an inorganic filler.

16. Any of embodiments 1 to 15, wherein the porous particles have a mode particle size of at least 3 μM and up to and including 20 μm.

17. Any of embodiments 1 to 16, wherein the one or more (c) additives further comprise an antimicrobial agent comprising silver metal, a silver-containing compound, copper metal, a copper-containing compound, or a mixture of any of these.

The following Examples are provided to illustrate the practice of this invention and are not meant to be limiting in any manner. The following materials were used in the Examples.

Materials Used in the Following Examples:

The continuous polymeric phase polymers used in the following examples were the Eastman™ Cellulose Acetate Butyrate 381-0.5 (CAB), a cellulose ester, $T_g$ of 130° C. (obtained from Chem Point); and Kao KBT-382, $T_g$ of 60° C., a bis-phenol type polyester [obtained from Kao Specialties Americas LLC, a part of Kao Corporation (Japan)].

NALCO® 1060 containing colloidal silica was obtained from Nalco Chemical Company as a 50 weight % aqueous dispersion.

The poly(methylamino ethanol adipate) (AMAE) co-stabilizer was prepared using known procedures and starting materials.

Carboxy methylcellulose (CMC, 250,000 kDa) was obtained from Acros Organics or from Ashland Aqualon as Aqualon 9M31F. These products were used interchangeably.

The amphiphilic block copolymer of polyethylene oxide and polycaprolactone (PEO-b-PCL) 5K-20K, was prepared using the procedure described in U.S. Pat. No. 5,429,826 (Nair et al.) where the first number is the molecular weight of the hydrophilic block segment, PEO, and the second number is the molecular weight of the oleophilic block segment, PCL.

TERGITOL® 15-S-7, a C12-C14 secondary alcohol surfactant having an HLB value of 12.4, was obtained from the Dow Chemical Corp.

The optical brightener TINOPAL® OB CO was obtained from BASF Corporation.

The porous substrates used in the Examples below were various porous woven fabrics, porous polyester materials, and porous cotton materials, all having a weight of approximately 80-110 g/m².

The carbon black (K) opacifying colorant used as an aqueous dispersion was Regal 330 (Cabot Corp.) that was hydrophobically surface modified.

The yellow (Y1) tinting colorant, Pigment Yellow 83 (Monolite Diarylide Yellow HR) was obtained from Heubach, Heucotech Ltd.

The yellow (Y2) tinting colorant, Pigment Yellow 3 (Hansa Yellow 3) was obtained from Lansco Colors.

The cyan (C) tinting colorant, Pigment Blue 15:3 (Sunfast Blue 15:3) was obtained from Sun Chemical.

The magenta (M) pigment, Pigment Red 185 (Graphtol Carmine HF4C) was obtained from Clariant.

DISPERBYK® 190, a copolymer derived from polystyrene, polypropylene glycol, and polyethylene glycol, was obtained from BYK-Chemie USA.

SOLSPERSE® 43000, a polyacrylate polymeric dispersant, was obtained from Lubrizol Corp.

EAGLETEX® C-3018 and EAGLEBAN® FRC-0307 Drapery Compounds were obtained from Eagle Performance Products, where the binder material was a self-crosslinking terpolymer derived from acrylonitrile, n-butyl acrylate, and ethyl acrylate and having a glass transition temperature of −10° C.

Measurements:

The mode particle size of the porous particles used in the Examples was measured using a Sysmex FPIA-3000 automated particle size analyzer from Malvern Instruments. The particle size of the dispersed pigments was determined using light scattering.

The porosity of the porous particles was measured using the known mercury intrusion porosimetry method.

The light blocking ability of each foamed, opacifying element in the Examples, in transmitted light, was evaluated by measuring its light blocking value (LBV) using a custom-built apparatus consisting of a fiber optic Xenon light source, a computer controlled translational stage and an optical photometer. The fiber optic was positioned 10 mm above the surface of the fabric. A photo detector was placed on the other side of the sample element directly under the fiber optic in order to quantify the amount of light that passed through the sample element. The light blocking value of each sample was calculated by comparing the light intensity (I) that passed through the sample element to the light intensity ($I_0$) that reached the detector when no sample element was present, and using the equation:

$$-\log_{10}(I/I_0).$$

The luminous reflectance (or brightness) of each sample element was determined by first measuring the spectral reflectance in the 400-700 nm wavelength range using a Hunter Labs UltraScan XE colorimeter equipped with an integrating sphere and a pulsed Xenon light source. A light trap and a standard white tile were used to fix the reflectance range from 0 to 100%. The X, Y, and Z tristimulus values of each dry opacifying layer were also determined and used in conjunction with the CIELab color space (standard D65 illuminant) to calculate specific values for the lightness (L*), red-green character (a*), and yellow-blue character (b*) of each dry opacifying layer. The Y tristimulus value was used as a measure of the luminous reflectance or "brightness" of each sample.

Preparation of Pigment Dispersions for Porous Particles:

All pigment (opacifying colorants and tinting colorants) dispersions were prepared by combining dry pigment, a dispersant, and a liquid in a suitable milling vessel. The particle size of each pigment was reduced by milling it using ceramic media until all pigment particles were reduced below a diameter of 1 µm as determined by optical microscopy. The dispersions were further diluted in the same liquid medium for incorporation into porous particles or foamed aqueous composition. The dispersions varied in the type of pigment, dispersant and dispersant level relative to pigments shown below in TABLE I. Dv is the volume weighted mean diameter, in nanometers. In TABLE I, the Dispersion is identified by the pigments (K, Y1, Y2, C, or M).

TABLE I

| Dispersions | | | | |
| --- | --- | --- | --- | --- |
| Dispersion | Pigment | Dispersant (weight % of Pigment) | Pigment Weight % | Dv (nm) |
| D-K | K | SOLSPERSE® 43000 (25) | 10.72 | 101 |
| D-Y1 | Y1 | SOLSPERSE® 43000 (20) | 8.60 | 247 |
| D-Y2 | Y2 | SOLSPERSE® 43000 (20) | 16.83 | 289 |
| D-C | C | SOLSPERSE® 43000 (30) | 19.08 | 139 |
| D-M | M | Disperbyk® 190 (20) | 15.12 | 289 |

Preparation of Porous Particles:

The various porous particles used for preparing a foamed, opacifying element for each Invention Example and Comparative Example are described below and TABLE II below summarizes the characteristics of the particles. All of the porous particles contained 1 weight % of optical brightener in the continuous polymeric phase.

P1 Porous Particles Containing 1 Weight % Opacifying Colorant (K) in the Discrete Pores and Kao KBT382 in Continuous Polymeric Phase An aqueous phase was made up by dissolving 68.2 grams of CMC in 3,450 grams of distilled water and adding to 134 grams of the D-K dispersion containing 18.6 weight % of the surface modified carbon black. This aqueous phase was dispersed in 11,363 grams of an oil phase containing 2,475 grams of Kao KBT382 polyester and 25 grams of the optical brightener, TINOPAL® OB CO in ethyl acetate using a homogenizer. The resulting water-in-oil emulsion was dispersed using the Silverson L4R homogenizer for two minutes at 1200 RPM, in 54,338 grams of a 200 mmolar pH 4 acetate buffer containing 3050 grams of NALCO® 1060 colloidal silica, followed by homogenization in an orifice homogenizer at 1000 psi (70.4 kg$_f$/cm$^2$) to form a water-in-oil-in-water double emulsion. The ethyl acetate was removed under reduced pressure at 40° C. after dilution of the water-in-oil-in-water emulsion with an equal weight of water. The resulting suspension of solidified porous particles was filtered and the P1 porous particles were washed with water several times, followed by rinsing with a 0.1 weight % solution of TERGITOL® 15-S-7 surfactant. The isolated P1 porous particles were then air dried. Typically, the discrete pores contained within the porous particles prepared according to this procedure had an average diameter of from 150 nm and up to and including 1,500 nm.

P2 Porous Particles Containing 1 Weight % Yellow Pigment (Y1) in the Discrete Pores and 1 Weight % Optical Brightener in Continuous Polymeric Phase Cellulose Acetate Butyrate to Provide Tinting Colorant An aqueous phase was made up by dissolving 5 grams of CMC in 240.5 grams of distilled water and adding to 11.6 grams of the D-Y1 dispersion containing 8.6 weight % of PY83. This aqueous phase was dispersed in 831.8 grams of an oil phase containing 97.7 grams of CAB, 2 grams of PEO-PCL and 1 gram of the optical brightener, TINOPAL® OB CO in ethyl acetate using a homogenizer. A 975-gram aliquot of the resulting water-in-oil emulsion was dispersed using the Silverson L4R homogenizer for two minutes at 1200 RPM, in 1,625 grams of a 200 mmolar pH 4 acetate buffer containing 39 grams of NALCO® 1060 colloidal silica, and 9.75 grams of AMAE co-stabilizer followed by homogenization in an orifice homogenizer at 1000 psi (70.4 kg$_f$/cm$^2$) to form a water-in-oil-in-water double emulsion. The ethyl acetate was removed, and the resulting P2 porous particles were washed and isolated as described for P1

P3 Porous Particles Containing 1 Weight % Opacifying Colorant (K) in the Discrete Pores and 1 Weight % Optical Brightener in Continuous Polymeric Phase Cellulose Acetate Butyrate The P3 porous particles were prepared as described for the P2 porous particles except that the D-K dispersion was used in place of the D-Y1 dispersion.

P4 Porous Particles Containing 5 Weight % Yellow Pigment (Y2) in the Discrete Pores and 1 Weight % Optical Brightener in Continuous Polymeric Phase Cellulose Acetate Butyrate The P4 porous particles were prepared as described for the P2 porous particles except that the D-Y2 dispersion was used in place of the D-Y1 dispersion.

P5 Porous Particles Containing 5 Weight % Cyan Pigment (C) in the Discrete Pores and 1 Weight % Optical Brightener in Continuous Polymeric Phase Cellulose Acetate Butyrate The P5 porous particles were prepared as described for the P2 porous particles except that the D-C dispersion was used in place of the D-Y1 dispersion.

P6 Porous Particles Containing 5 Weight % Magenta Pigment (M) in the Discrete Pores and 1 Weight % Optical Brightener in Continuous Polymeric Phase Cellulose Acetate Butyrate The P6 porous particles were prepared as described for the P2 porous particles except that the D-M dispersion was used in place of the D-Y1 dispersion.

P7 Porous Particles Containing 0.8 Weight % Opacifying Colorant (K) in the Discrete Pores and 1 Weight % Optical Brightener in Continuous Polymeric Phase Cellulose Acetate Butyrate The P7 porous particles were prepared as described for the P3 porous particles except that the amount of the D-K dispersion used was lower to obtain the desired level of K in the porous particles.

P8 Porous Particles Containing No Opacifying Colorant and 1 weight % Optical Brightener in Continuous Polymeric Phase Cellulose Acetate Butyrate The P8 porous particles were prepared as described for the P2 porous particles except that no pigment dispersion was used in the preparation.

TABLE II

| Porous Particles | Features | Particle size (μm) | Porosity (Vol %) |
| --- | --- | --- | --- |
| P1 | 1 weight % K in discrete pores and continuous polymeric phase Kao KBT382 | 4.5 | 28 |
| P2 | 1 weight % Yellow Pigment (Y1) in the discrete pores and continuous polymeric phase CAB to provide tinting colorant | 5.9 | 56 |
| P3 | 1 weight % K in discrete pores and continuous polymeric phase CAB | 6.8 | 57 |
| P4 | 5 weight % Yellow Pigment (Y2) in the discrete pores and continuous polymeric phase CAB to provide tinting colorant | 5.7 | 52 |
| P5 | 1 weight % Cyan Pigment (C) in the discrete pores and continuous polymeric phase CAB to provide tinting colorant | 6.8 | 52 |
| P6 | 1 weight % Magenta Pigment (M) in the discrete pores and continuous polymeric phase CAB to provide tinting colorant | 5.7 | 57 |
| P7 | 0.8 weight % K in discrete pores and continuous polymeric phase CAB | 6.6 | 49 |
| P8 | no opacifying colorant and continuous polymeric phase CAB | 7.6 | 54 |

Preparation of Foamable Aqueous Compositions; Foamed Aqueous Compositions; and Foamed, Opacifying Elements:

In general, each foamable aqueous composition was made by incorporating the appropriate porous particles in either a 48 weight % solids EAGLETEX® C-3018 Drapery Compound or a 55 weight % solids EAGLEBAN® FRC-0307 Drapery Compound. For each foamed aqueous composition, the drapery compound was added to an appropriately sized container. Porous particles in the various examples were dispersed into the mixture by stirring at 1200 rev/minute with a 50 mm diameter Cowles blade at ambient temperature for 30-60 minutes. Each of the resulting dispersions (foamable aqueous composition) was used to prepare a foamed aqueous composition under pressure using an Oakes 2M Laboratory Mixer Model 2MBT1A. Each resulting foamed aqueous composition, having a density of from 0.20 g/cm³ to 0.25 g/cm³, was coated onto a surface of the porous substrate described above with a coating knife, dried at a temperature of from 120° C. to 160° C. as described in the Examples below until the moisture content was less than 2 weight %, and crushed ("densified") on the porous substrate between hard rollers under pressure.

Comparative Example 1

A comparative foamable aqueous composition was prepared from 950 grams of EAGLETEX® C-3018 Drapery Compound and 50 grams of a 60.54% weight % aqueous dispersion of P1 porous particles. The resulting foamable aqueous composition was foamed (aerated) and coated onto a surface of the porous substrate described above with a coating knife with a 2.794 mm (0.110 inch) gap. The coating was dried at 120° C. for 10 minutes in a forced air oven. The resulting dry foamed layer (dry opacifying layer) in the resulting dry foamed, opacifying element contained 6.11 weight % of the P1 porous particles, 0.0611 weight % of carbon black, and 0.146 g/m² of carbon black on a dry weight basis. The LBV of the dry opacifying layer was 4; the layer had a weight of 238 g/m², and a luminous reflectance of 48.

Comparative Example 2

Another comparative foamable aqueous composition was prepared from 1000 g of EAGLETEX® C-3018 Drapery Compound. No porous particles were included. The foamable aqueous composition was foamed (aerated) and coated onto a surface of the porous substrate described above with a coating knife with a 2.54 mm (0.100 inch) gap in a pilot coating machine at 1 m/min and dried at 160° C. The resulting dry foamed composition of the resulting foamed, opacifying element did not contain porous particles or carbon black or another opacifying colorant. Although the luminous reflectance was 86 of the foamed, opacifying element, its LBV was only 2 for the dry opacifying layer having a weight of 278 g/m² and the element therefore was not sufficiently light-blocking.

Comparative Example 3

Still another comparative foamable aqueous composition was prepared from of 936.65 grams of EAGLETEX® C-3018 Drapery Compound and 63.35 grams of a 52.11 weight % dispersion of the P8 porous particles. The resulting foamable aqueous composition was foamed (aerated) and coated onto a surface of the porous substrate described above with a coating knife with a 2.54 mm (0.100 inch) gap as described in Comparative Example 2. The resulting dry foamed composition of the resulting foamed, opacifying element contained 6.71 weight % the P8 porous particles but there was no carbon black or other opacifying colorant. Although the luminous reflectance was 80, the LBV of the element was only 2 for the dry opacifying layer weight of 190 g/m² and therefore the foamed, opacifying element was not sufficiently light-blocking.

Invention Example 1

A foamable aqueous composition according to the present invention was prepared from 940.3 grams of EAGLETEX® C-3018 Drapery Compound and 59.7 grams of a 49.76 weight % aqueous dispersion of the P3 porous particles. This foamable aqueous composition was foamed (aerated) to provide a foamed aqueous composition according to the present invention, which was coated onto a surface of the porous substrate described above with a coating knife with a 2.794 mm (0.110 inch) gap. The coating was dried as described in Comparative Example 1. The dry foamed composition (dry opacifying layer) contained 6.10 weight % of the P3 porous particles, 0.0610 weight % of carbon black, and 0.136 g/m² of carbon black on a dry weight basis. The resulting foamed, opacifying element exhibited an LBV of 5 for the dry opacifying layer weight of 223 g/m², which was significantly more opacifying than the foamed, opacifying element of Comparative Example 1. The inventive foamed, opacifying element was also brighter in appearance given the higher luminous reflectance value of 53 compared to that of Comparative Example 1. These advantages of Invention Example 1 are due to the higher $T_g$ of cellulose acetate butyrate material used as the continuous polymeric phase of the porous particles and its ability to survive high temperature drying without losing the light scattering property of the pores in the porous particles, improving both brightness and, in conjunction with the carbon black opacifying colorant, the opacity.

Invention Example 2

A foamable aqueous composition according to the present invention was prepared with 1,399.8 grams of EAGLETEX® C-3018 Drapery Compound and 100.2 grams of a 49.25 weight % aqueous dispersion of the P7 porous particles. This foamable aqueous composition was foamed (aerated) and the foamed aqueous composition according to the present invention coated onto a surface of the porous substrate described above with a coating knife with a 2.54 mm (0.100 inch) gap as described in Comparative Example 2. The dry foamed composition (dry opacifying layer) in the foamed, opacifying element according to this invention contained 6.71 weight % of the P7 porous particles, 0.0557 weight % of carbon black, and 0.136 g/m² of carbon black on a dry weight basis. This inventive foamed, opacifying element exhibited an LBV of 5.8 for the dry opacifying layer weight of 244 g/m², and it had a luminous reflectance value of 52.

Invention Example 3

A foamable aqueous composition according to the present invention was prepared with 1388.3 g of EAGLETEX® C-3018 Drapery Compound, 100.2 grams of a 49.25 weight % aqueous dispersion of the P7 porous particles, and 11.5 grams of a 49.22 weight % aqueous dispersion of the P2 porous particles. This aqueous foamable composition was foamed (aerated) and the resulting foamed aqueous composition according to this invention was coated onto a surface of the porous substrate described above with a coating knife with a 2.54 mm (0.100 inch) gap as described in Comparative Example 2. The dry foamed composition (dry opacifying layer) in the foamed, opacifying element according to this invention contained 7.49 weight % of the P7 and P2 porous particles, 0.0557 weight % of carbon black, 0.0078 weight % of yellow pigment Y1, and 0.137 g/m² of carbon black on a dry weight basis. This inventive foamed, opacifying element exhibited an LBV of 5.9 for a dry opacifying layer weight of 246 g/m², and a luminous reflectance value of 52, the same as for Invention Example 2 but this Invention Example 3 foamed, opacifying element also exhibited a yellow tinted appearance that was reflected in the b* value of 0.46.

Invention Example 4

A foamable aqueous composition according to the present invention was prepared with 1,388.9 grams of EAGLE-TEX® C-3018 Drapery Compound, 100.2 grams of a 49.25 weight % aqueous dispersion of the P7 porous particles, and 10.9 grams of a 52.39 weight % aqueous dispersion of the P5 porous particles. This composition was foamed (aerated) and the resulting foamed aqueous composition was coated onto a surface of the porous substrate described above with a coating knife with a 2.54 mm (0.100 inch) gap as described in Comparative Example 2. The dry foamed composition (dry opacifying layer) in the foamed, opacifying element according to this invention contained 7.48 weight % of the P7 and P5 porous particles, 0.0557 weight % of carbon black, 0.0078 weight % of cyan pigment C, and 0.135 g/m² of carbon black on a dry weight basis. This inventive foamed, opacifying element exhibited an LBV of 6 for the dry opacifying layer weight of 242 g/m², and a luminous reflectance value of 51.5, similar to that of Invention Example 2 but Invention Example 4 also exhibited a cyan tinted appearance that was reflected in the b* value of −1.82.

Invention Example 5

A foamable aqueous composition according to the present invention was prepared with 926.0 grams of EAGLETEX® C-3018 Drapery Compound, 66.8 grams of a 49.25 weight % aqueous dispersion of the P7 porous particles, and 7.2 grams of a 53.46 weight % aqueous dispersion of the P6 porous particles. This composition was foamed (aerated) and the resulting foamed aqueous composition was coated onto a surface of the porous substrate described above with a coating knife with a 2.54 mm (0.100 inch) gap as described in Comparative Example 2. The dry foamed composition of the foamed, opacifying element according to this invention contained 7.49 weight % of the P7 and P6 porous particles, 0.0557 weight % of carbon black, 0.0078 weight % of magenta pigment M and 0.111 g/m² of carbon black on a dry weight basis. This inventive foamed, opacifying element exhibited an LBV of 5.3 for a dry opacifying layer weight of 199 g/m², and a luminous reflectance value of 52, the same as for Invention Example 2 but it also exhibited a magenta tinted appearance that was reflected in the a* value of 1.19 and b* value of −1.31.

Invention Example 6

A foamable aqueous composition was prepared according to the present invention with 868.9 grams of EAGLEBAN® FRC-0307 Drapery Compound and 131.12 grams of a 49.25 weight % aqueous dispersion of the P7 porous particles. This composition was foamed (aerated) and the resulting foamed aqueous composition was coated onto a surface of the porous substrate described above with a coating knife with a 1.52 mm (0.060 inch) gap as described in Comparative Example 2. The dry foamed composition of the foamed, opacifying element contained 11.91 weight % of the P7 porous particles, 0.0989 weight % of carbon black, and 0.165 g/m² of carbon black on a dry weight basis. This inventive foamed, opacifying element exhibited an LBV of 6.2 that increased the opacifying ability of the thinner dry opacifying layer weight of 167 g/m² compared to the previous Invention Examples, and the luminous reflectance value was 43.

Invention Example 7

A foamable aqueous composition was prepared according to the present invention with 881 g of EAGLEBAN® FRC-0307 Drapery Compound, 114.1 grams of a 49.25 weight % aqueous dispersion of the P7 porous particles, and 4.91 grams of a 51.1 weight % dispersion of the P4 porous particles. This composition was foamed (aerated) and the resulting foamed aqueous composition was coated onto a surface of the porous substrate described above with a coating knife with a 1.52 mm (0.060 inch) gap as described in Comparative Example 2. The dry foamed composition (dry opacifying layer) in the foamed, opacifying element contained 10.81 weight % of the P7 and the P4 porous particles, 0.0859 weight % of carbon black, 0.0231 weight % of yellow tinting colorant Y2, and 0.161 g/m² of carbon black on a dry weight basis. This inventive foamed, opacifying element exhibited a very high LBV of 6.7 and increased opacifying ability of the dry opacifying layer weight of 188 g/m² similarly to Invention Example 6. The luminous reflectance value measured for this inventive foamed, opacifying element was 44 and the measured b* value of 0.46 reflects the presence of the yellow tinting colorant.

The invention has been described in detail with particular reference to certain preferred embodiments thereof, but it will be understood that variations and modifications can be effected within the spirit and scope of the invention.

The invention claimed is:

1. A foamable aqueous composition that has at least 35% solids and up to and including 70% solids, and comprises:
    (a) at least 0.05 weight % and up to and including 15 weight % of porous particles, each porous particle comprising a continuous polymeric phase and a first set of discrete pores dispersed within the continuous polymeric phase, the porous particles having a mode particle size of at least 2 μm and up to and including 50 μm and a porosity of at least 20 volume % and up to and including 70 volume %, and the continuous polymeric phase having a glass transition temperature greater than 80° C. and comprising a polymer having a viscosity of at least 80 centipoises and up to and including 500 centipoises at a shear rate of 100 sec⁻¹ in ethyl acetate at a concentration of 20 weight % at 25° C.,
    (b) at least 20 weight % of a binder material;
    (c) at least 0.0001 weight % of one or more additives comprising at least one surfactant;
    (d) water; and
    (e) at least 0.001 weight % of an opacifying colorant different from all of the one or more (c) additives, which opacifying colorant absorbs electromagnetic radiation having wavelengths of from 350 nm to 800 nm,
    all amounts based on the total weight of the foamable aqueous composition,
    wherein the foamable aqueous composition can provide a dry opacifying layer having a light blocking value of at least 4 as well as a luminous reflectance that is greater than 40% as measured by the Y tristimulus value.

2. The foamable aqueous composition of claim 1, wherein the continuous polymeric phase comprises at least 70 weight %, based on the total polymer weight in the continuous polymeric phase, of one or more polymers derived from one or more of cellulose acetate, cellulose butyrate, cellulose acetate butyrate, and cellulose acetate propionate.

3. The foamable aqueous composition of claim 1, wherein the opacifying colorant is a carbon black that is present in an amount of at least 0.003 weight % and up to and including 0.2 weight %, based on the total weight of the foamable aqueous composition.

4. The foamable aqueous composition of claim 1, comprising at least 0.5 weight % and up to and including 10 weight % of the porous particles that have a mode particle size of at least 3 μm and up to and including 30 μm, based on the total weight of the foamable aqueous composition.

5. The foamable aqueous composition of claim 1 having at least 40% solids and up to and including 60% solids, and wherein:
the continuous polymeric phase comprises at least 70 weight % and up to and including 100 weight %, based on the total polymer weight in the continuous polymeric phase, of one or more polymers derived from one or more of cellulose acetate, cellulose butyrate, cellulose acetate butyrate, and cellulose acetate propionate;
the porous particles are present in an amount of at least 0.5 weight % and up to and including 10 weight %;
the binder material is present in an amount of at least 30 weight % and up to and including 50 weight % and has a glass transition temperature of less than 25° C.;
the one or more (c) additives further comprise an optical brightener in an amount of at least 0.01 weight % and up to and including 2 weight %; and
carbon black is present as at least one opacifying colorant in an amount of at least 0.003 weight % and up to and including 0.2 weight %,
all amounts being based on the total weight of the foamable aqueous composition.

6. The foamable aqueous composition of claim 1, wherein the one or more (c) additives further comprise an optical brightener that is present within: the continuous polymeric phase of the porous particles; a volume of the first set of discrete pores; or both the volume of the first set of discrete pores and the continuous polymeric phase of the porous particles.

7. The foamable aqueous composition of claim 1, wherein the one or more (c) additives further comprise metal flakes that are present within the porous particles.

8. The foamable aqueous composition of claim 1, wherein the at least one surfactant of the one or more (c) additives is a foaming agent and the one or more (c) additives further comprise a foam stabilizing agent.

9. The foamable aqueous composition of claim 1, wherein the one or more (c) additives further comprise a tinting colorant that is present in an amount of at least 0.0001 weight % and up to and including 3 weight %, based on the total weight of the foamable aqueous composition.

10. The foamable aqueous composition of claim 1, wherein the one or more (c) additives comprise an optical brightener in an amount of at least 0.01 weight % and up to and including 2 weight %, based on the total weight of the foamable aqueous composition.

11. The foamable aqueous composition of claim 1, wherein the one or more (c) additives comprise two or more materials selected from a foaming agent, a foam stabilizing agent, a tinting colorant, an optical brightener, a flame retardant, an antimicrobial agent, and an inorganic filler.

12. A foamed aqueous composition that has at least 35% solids and up to and including 70% solids, and comprises:
(a) at least 0.05 weight % and up to and including 15 weight % of porous particles, each porous particle comprising a continuous polymeric phase and a first set of discrete pores dispersed within the continuous polymeric phase, the porous particles having a mode particle size of at least 2 μm and up to and including 50 μm and a porosity of at least 20 volume % and up to and including 70 volume %, and the continuous polymeric phase having a glass transition temperature greater than 80° C. and comprising a polymer having a viscosity of at least 80 centipoises and up to and including 500 centipoises at a shear rate of 100 sec$^{-1}$ in ethyl acetate at a concentration of 20 weight % at 25° C.,
(b) at least 20 weight % of a binder material;
(c) at least 0.0001 weight % of one or more additives comprising at least one surfactant;
(d) water; and
(e) at least 0.001 weight % of an opacifying colorant different from all of the one or more (c) additives, which opacifying colorant absorbs electromagnetic radiation having wavelengths of from 350 nm to 800 nm,
all amounts based on the total weight of the foamed aqueous composition, and wherein
the foamed aqueous composition having a foam density of at least 0.1 g/cm$^3$ and up to and including 0.5 g/cm$^3$, and
the foamed aqueous composition can provide a dry opacifying layer having a light blocking value of at least 4 as well as a luminous reflectance that is greater than 40% as measured by the Y tristimulus value.

13. The foamed aqueous composition of claim 12, having a foam density of at least 0.15 g/cm$^3$ and up to and including 0.4 g/cm$^3$.

14. The foamed aqueous composition of claim 12, wherein the continuous polymeric phase comprises at least 70 weight %, based on the total polymer weight in the continuous polymeric phase, of one or more polymers derived from one or more of cellulose acetate, cellulose butyrate, cellulose acetate butyrate, and cellulose acetate propionate.

15. The foamed aqueous composition of claim 12, wherein the opacifying colorant is a carbon black that is present in an amount of at least 0.003 weight % and up to and including 0.2 weight %, based on the total weight of the foamed aqueous composition.

16. The foamed aqueous composition of claim 12, wherein the porous particles have a mode particle size of at least 3 μm and up to and including 20 μm.

17. The foamed aqueous composition of claim 12 having at least 40% solids and up to and including 60% solids, and wherein:
the continuous polymeric phase comprises at least 70 weight % and up to and including 100 weight %, based on the total polymer weight in the continuous polymeric phase, of one or more polymers derived from one or more of cellulose acetate, cellulose butyrate, cellulose acetate butyrate, and cellulose acetate propionate;
the porous particles are present in an amount of at least 0.5 weight % and up to and including 10 weight %;
the binder material is present in an amount of at least 30 weight % and up to and including 50 weight % and has a glass transition temperature of less than 25° C.;
the one or more (c) additives further comprise an optical brightener that is present in an amount of at least 0.01 weight % and up to and including 2 weight %; and
carbon black is present as at least one opacifying colorant in an amount of at least 0.003 weight % and up to and including 0.2 weight %, all amounts based on the total weight of the foamed aqueous composition.

18. The foamed aqueous composition of claim 12, wherein the one or more (c) additives further comprise an optical brightener that is present within:
the continuous polymeric phase of the porous particles; a volume of the first set of discrete pores; or both the volume of the first set of discrete pores and the continuous polymeric phase of the porous particles.

19. The foamed aqueous composition of claim 12, wherein the at least one surfactant of the one or more (c) additives is a foaming agent and the one or more (c) additives further comprise a foam stabilizing agent.

20. The foamed aqueous composition of claim 12, wherein the one or more (c) additives further comprise a tinting colorant that is present in an amount of at least 0.0001 weight % and up to and including 3 weight %, based on the total weight of the foamed aqueous composition.

21. The foamed aqueous composition of claim 12, wherein the one or more (c) additives further comprise an optical brightener that is present in an amount of at least 0.01 weight % and up to and including 2 weight %, based on the total weight of the foamed aqueous composition.

22. The foamed aqueous composition of claim 12, wherein the one or more (c) additives comprise two or more materials selected from a foaming agent, a foam stabilizing agent, a tinting colorant, an optical brightener, a flame retardant, an antimicrobial agent, and an inorganic filler.

23. The foamed aqueous composition of claim 12, wherein the one or more (c) additives further comprise an antimicrobial agent comprising silver metal, a silver-containing compound, copper metal, a copper-containing compound, or a mixture of any of these.

* * * * *

UNITED STATES PATENT AND TRADEMARK OFFICE
CERTIFICATE OF CORRECTION

PATENT NO. : 10,138,342 B2
APPLICATION NO. : 15/239915
DATED : November 27, 2018
INVENTOR(S) : Nair et al.

It is certified that error appears in the above-identified patent and that said Letters Patent is hereby corrected as shown below:

On the Title Page

Item (54) and in the Specification, Column 1, Lines 1-2, the title, delete "FORMABLE AND FOAMED AQUEOUS COMPOSITIONS" and insert -- FOAMABLE AND FOAMED AQUEOUS COMPOSITIONS --.

Signed and Sealed this
Fifteenth Day of January, 2019

Andrei Iancu
*Director of the United States Patent and Trademark Office*